United States Patent
Ogasahara et al.

(10) Patent No.: US 11,588,558 B2
(45) Date of Patent: Feb. 21, 2023

(54) FREQUENCY DEVIATION COMPENSATION SCHEME AND FREQUENCY DEVIATION COMPENSATION METHOD

(71) Applicant: NEC Corporation, Tokyo (JP)

(72) Inventors: Daisaku Ogasahara, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/557,251

(22) Filed: Dec. 21, 2021

(65) Prior Publication Data
US 2022/0116121 A1 Apr. 14, 2022

Related U.S. Application Data

(63) Continuation of application No. 17/077,501, filed on Oct. 22, 2020, now Pat. No. 11,233,575, which is a (Continued)

(30) Foreign Application Priority Data

Nov. 15, 2013 (JP) .................. 2013-236643

(51) Int. Cl.
*H04B 10/00* (2013.01)
*H04B 10/61* (2013.01)
(Continued)

(52) U.S. Cl.
CPC ..... *H04B 10/6164* (2013.01); *H04B 10/0795* (2013.01); *H04B 10/6165* (2013.01); *H04L 27/26526* (2021.01)

(58) Field of Classification Search
CPC ............... H04B 10/2507; H04B 10/40; H04B 10/6164; H04B 10/6165
See application file for complete search history.

(56) References Cited

U.S. PATENT DOCUMENTS

| 10,833,771 B2 | 11/2020 | Ogasahara ......... H04B 10/0795 |
| 2011/0255877 A1 | 10/2011 | Nakashima et al. |
| 2012/0033965 A1 | 2/2012 | Zhang et al. |
| 2012/0177383 A1 | 7/2012 | Tanimura et al. |

(Continued)

FOREIGN PATENT DOCUMENTS

| JP | 2009-130935 A | 6/2009 |
| JP | 2009-135930 A | 6/2009 |

(Continued)

OTHER PUBLICATIONS

Z. Tao et al., "Simple, Robust, and Wide-Range Frequency Offset Monitor for Automatic Frequency Control in Digital Coherent Receivers", 2007 33rd European Conference and Exhibition of Optical Communication (ECOC2007) English Abstract Cited in the Specification.

(Continued)

*Primary Examiner* — Daniel G Dobson
(74) *Attorney, Agent, or Firm* — Sughrue Mion, PLLC

(57) ABSTRACT

When a frequency deviation compensation amount is compensated for by use of frequency shift, a phase offset occurs between adjacent input blocks included in a plurality of input blocks as divided, with the result that an error occurs in a reconstructed bit sequence. A frequency deviation compensation system of the invention is characterized by comprising: a frequency deviation compensation means for compensating for a frequency deviation occurring in a signal by use of frequency shift; and a phase offset compensation means for compensating for a phase offset occurring, in the signal, due to the frequency shift.

15 Claims, 18 Drawing Sheets

Related U.S. Application Data continuation of application No. 16/807,318, filed on Mar. 3, 2020, now Pat. No. 10,833,771, which is a continuation of application No. 16/583,437, filed on Sep. 26, 2019, now Pat. No. 10,615,882, which is a continuation of application No. 16/238,680, filed on Jan. 3, 2019, now Pat. No. 10,454,590, which is a continuation of application No. 15/033,955, filed as application No. PCT/JP2014/005376 on Oct. 13, 2014, now Pat. No. 10,218,447.

(51) Int. Cl.
*H04L 27/26* (2006.01)
*H04B 10/079* (2013.01)
*H04J 14/00* (2006.01)

(56) References Cited

U.S. PATENT DOCUMENTS

| | | |
|---|---|---|
| 2012/0237204 A1 | 9/2012 | Zhou |
| 2013/0251369 A1 | 9/2013 | Ogasahara |
| 2015/0125150 A1 | 5/2015 | Sugitani et al. |
| 2015/0147071 A1 | 5/2015 | Kawasoe et al. |
| 2016/0183211 A1 | 6/2016 | Ogasahara |

FOREIGN PATENT DOCUMENTS

| | | | |
|---|---|---|---|
| JP | 2011-009956 A | | 1/2011 |
| JP | 2011-199687 A | | 10/2011 |
| JP | 2011-228819 A | | 11/2011 |
| JP | 2012-147064 A | | 8/2012 |
| JP | 2013-048453 A | | 3/2013 |
| JP | 2013-162166 A | | 8/2013 |
| JP | 2013162166 A | * | 8/2013 |

OTHER PUBLICATIONS

International Search Report for PCT Application no. PCT/JP2014/005376, dated Jan. 6, 2015.
English translation of Written opinion for PCT Application No. PCT/JP2014/005376, dated Jan. 6, 2015.
Machine Translation JP 2013-162166 A, retreived Mar. 5, 2018.
Japanese Office Action for JP Application No. 2019-032552 dated Dec. 3, 2019 with English Translation.
Japanese Office Communication for JP Application No. 2020-012581 dated Sep. 7, 2021 with English Translation.
Japanese Office Action for JP Application No. 2021-165140, dated Aug. 30, 2022 with English Translation.

* cited by examiner

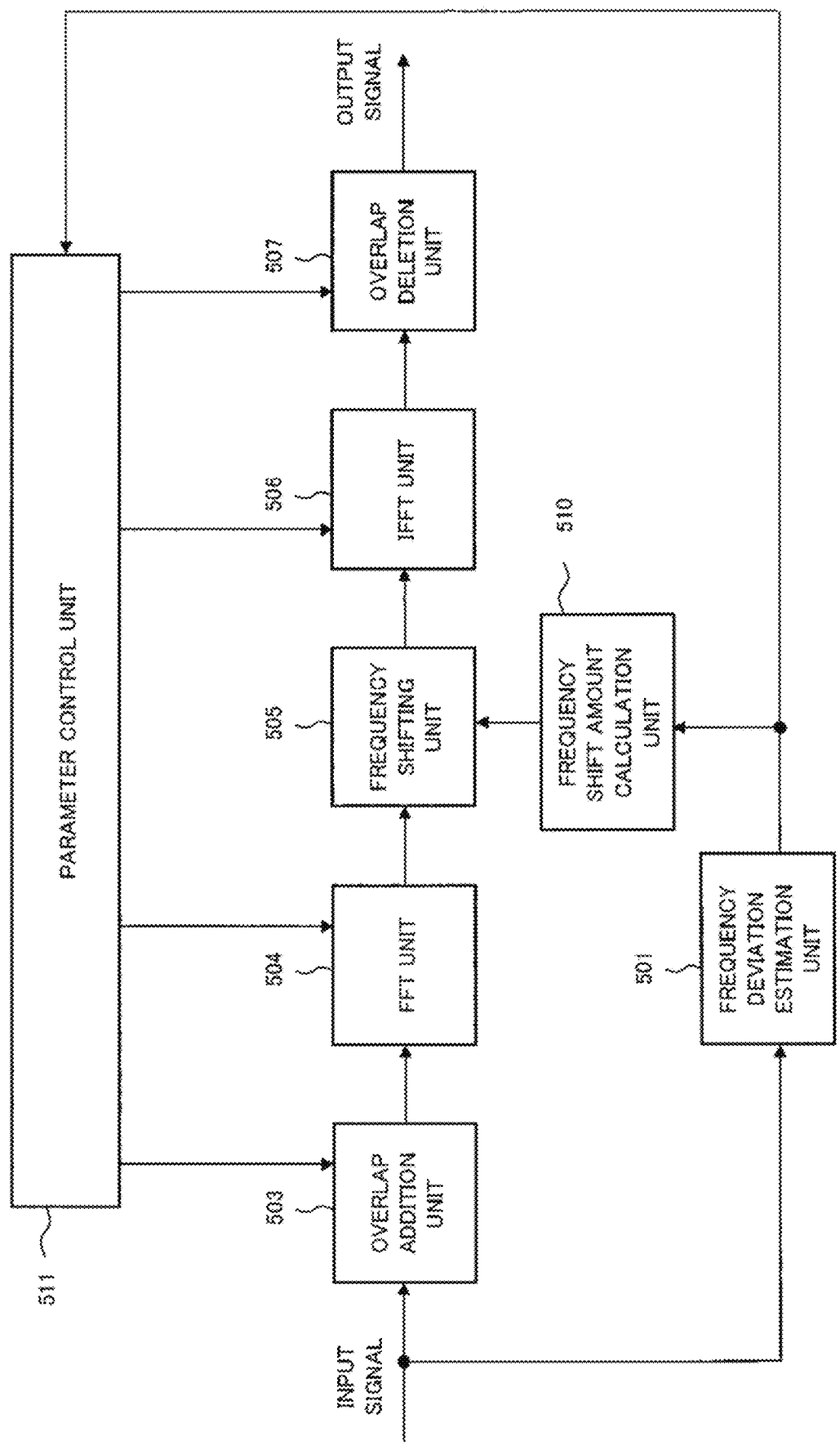

FREQUENCY DEVIATION COMPENSATION SCHEME AND FREQUENCY DEVIATION COMPENSATION METHOD

CROSS-REFERENCE TO RELATED APPLICATIONS

The present application is a Continuation application of U.S. patent application Ser. No. 17/077,501 filed on Oct. 22, 2020, which is continuation application of U.S. patent application Ser. No. 16/807,318 filed on Mar. 3, 2020, which issued as U.S. Pat. No. 10,833,771, which is a continuation application of U.S. patent application Ser. No. 16/583,437 filed on Sep. 26, 2019, which issued as U.S. Pat. No. 10,615,882, which is a continuation application of U.S. patent application Ser. No. 16/238,680 filed on Jan. 3, 2019, which issued as U.S. Pat. No. 10,454,590, which is a continuation application of U.S. patent application Ser. No. 15/033,955 filed on May 3, 2016, which issued as U.S. Pat. No. 10,218,447, which is a National Stage Entry of International Application PCT/JP2014/005376, filed on Oct. 13, 2014, which claims the benefit of priority from Japanese Patent Application 2013-236643 filed on Nov. 15, 2013, the disclosures of all of which are incorporated in their entirety by reference herein.

TECHNICAL FIELD

The present invention relates to a frequency deviation compensation scheme and a frequency deviation compensation method.

BACKGROUND ART

The widespread use of the Internet has led to a rapid increase in traffic volume for backbone communication systems. This has created a desire for realization of practical optical communication systems operating at ultra-high speed exceeding 100 Gbps. One technology attracting attention to realize ultrafast optical communication systems is the digital coherent scheme that combines an optical phase modulation scheme with a polarization multiplexing and demultiplexing technique.

PTL 1 and NPL 1 respectively disclose techniques to compensate for a frequency deviation in digital coherent receivers.

The digital coherent receiver described in NPL 1 uses local oscillation light whose oscillating frequency can be controlled to compensate for a frequency deviation by controlling the oscillating frequency of the local oscillation light in the direction opposite to a frequency deviation setting value. However, the configuration described in NPL 1 requires an arrangement for controlling the oscillating frequency of the local oscillation light.

The digital coherent receiver according to PTL 1 compensates for waveform distortion by conducting an overlap-type fast Fourier transform (FFT) and inverse FFT (IFFT). This digital coherent receiver has circuitry which includes an input unit, an FFT input frame generation unit, an FFT processing unit, a characteristic multiplication unit, an IFFT processing unit, an IFFT output frame extraction unit, and an output unit. Assuming that the input data consists of 256 parallel signals and the window size for FFT and IFFT is 1,024, the digital coherent receiver according to PTL 1 operates as follows.

The input unit buffers the input data (time domain: 256 samples), generates a frame consisting of 512 samples every two clocks, and outputs the frame to the FFT input frame generation unit.

With respect to the inputted sample frames, the FFT input frame generation unit generates a frame consisting of 1,024 samples by combining the current 512-sample frame with the immediately preceding 512-sample frame and outputs the generated frame to the FFT processing unit.

The FFT processing unit transforms the inputted frame into frequency-domain data and outputs it to the characteristic multiplication unit.

With respect to the inputted frequency-domain data, the characteristic multiplication unit multiplies characteristic parameters for each frequency component (1,024 frequencies) and outputs the results to the IFFT processing unit. The characteristic parameters are inputted, for example, from an external area.

The IFFT processing unit transforms the inputted frame into time-domain data and outputs it to the IFFT output frame extraction unit. In front and behind of this frame outputted from the IFFT processing unit, discontinuous points are included.

The IFFT output frame extraction unit discards 256 samples each, i.e., a quarter of the window size, from the front and rear of the inputted frame. If discontinuous points are within the area discarded by the IFFT output frame extraction unit, no discontinuous points are generated in the output obtained by joining 512 samples that have not been discarded. The IFFT output frame extraction unit outputs the processed frame to the output unit.

The output unit takes out every 256 samples per one clock from an inputted frame (512 samples outputted every two clocks) and outputs them to the subsequent stage in the form of parallel signals.

The above-described digital coherent receiver according to PTL 1 includes circuitry for performing the above-mentioned overlap-type FFT and IFFT to inhibit discontinuous points from occurring.

CITATION LIST

Patent Literature

[PTL 1] Japanese Unexamined Patent Application Publication No. 2011-9956

Non Patent Literature

[NPL 1] Z. Tao et al., "Simple, Robust, and Wide-Range Frequency Offset Monitor for Automatic Frequency Control in Digital Coherent Receivers", 2007 33rd European Conference and Exhibition of Optical Communication (ECOC2007)

SUMMARY OF INVENTION

Technical Problem

In the case where the digital coherent receiver compensates for a frequency deviation of a received optical signal, the receiver may compensate for the frequency deviation through a frequency-shifting process. However, when the digital coherent receiver including the overlap-type FFT and IFFT compensates for a frequency deviation through a frequency-shifting process, a phase offset will occur between one of a plurality of frames into which an input signal is divided and the immediately preceding or following frame. This will result in an error in the finally recovered bit string. In particular, there is even a risk of temporarily interrupting communications if the employed communication mode is not differential coding.

The present invention has been designed in view of the above-described problems and has an object of providing a frequency deviation compensation scheme and a frequency deviation compensation method that prevent errors which may be caused by a phase offset, even when a frequency deviation is compensated for through a frequency-shifting process.

Solution to Problem

A frequency deviation compensation scheme of the present invention includes a frequency deviation compensation means for compensating for, by frequency shifting, a frequency deviation caused to a signal; and a phase offset compensation means for compensating for a phase offset caused to the signal due to the frequency shifting.

Another frequency deviation compensation scheme of the present invention includes a compensation amount calculation means for adjusting an amount of frequency deviation compensation of a signal in such a way that a phase offset caused to the signal is a predetermined amount; and a frequency deviation compensation means for compensating for a frequency deviation of the signal based on the adjusted amount of frequency deviation compensation.

A frequency deviation compensation method of the present invention includes compensating for, by frequency shifting, a frequency deviation caused to a signal; and compensating for a phase offset caused to the signal due to the frequency shifting.

Another frequency deviation compensation method of the present invention includes adjusting an amount of frequency deviation compensation of a signal in such a way that a phase offset caused to the signal is a predetermined amount; and compensating for the frequency deviation of the signal based on the adjusted amount of frequency deviation compensation.

Advantageous Effects of Invention

According to the present invention, errors attributable to a phase offset are prevented even when a frequency-shifting process is used for compensating for a frequency deviation.

BRIEF DESCRIPTION OF DRAWINGS

FIG. 18 is another block diagram illustrating the frequency deviation compensation unit 206 according to the fifth exemplary embodiment.

DESCRIPTION OF EMBODIMENTS

First Exemplary Embodiment

A first exemplary embodiment of the present invention will now be described. To begin with, the digital coherent scheme is described. One technology attracting attention to realize ultrafast optical communication systems is the digital coherent scheme that combines an optical phase modulation scheme with a polarization multiplexing and demultiplexing technique.

The optical phase modulation scheme is a scheme for data modulation imposed on the phase of transmitted laser light, unlike the optical intensity modulation scheme where data modulation is imposed on the optical intensity of transmitted laser light. Some optical phase modulation schemes are known, such as QPSK (Quadruple Phase Shift Keying) and 16QAM (16 Quadrature Amplitude Modulation) schemes.

According to the polarization multiplexing and demultiplexing technique, optical carrier waves are set in a single frequency band and two independent single-polarization optical signals whose polarization states are orthogonal to each other are polarization-multiplexed in an optical transmitter. Then, in an optical receiver, these two independent single-polarization optical signals are separated from the received optical signal. The polarization multiplexing and demultiplexing technique achieves a two-fold transmission speed.

Figure 1:
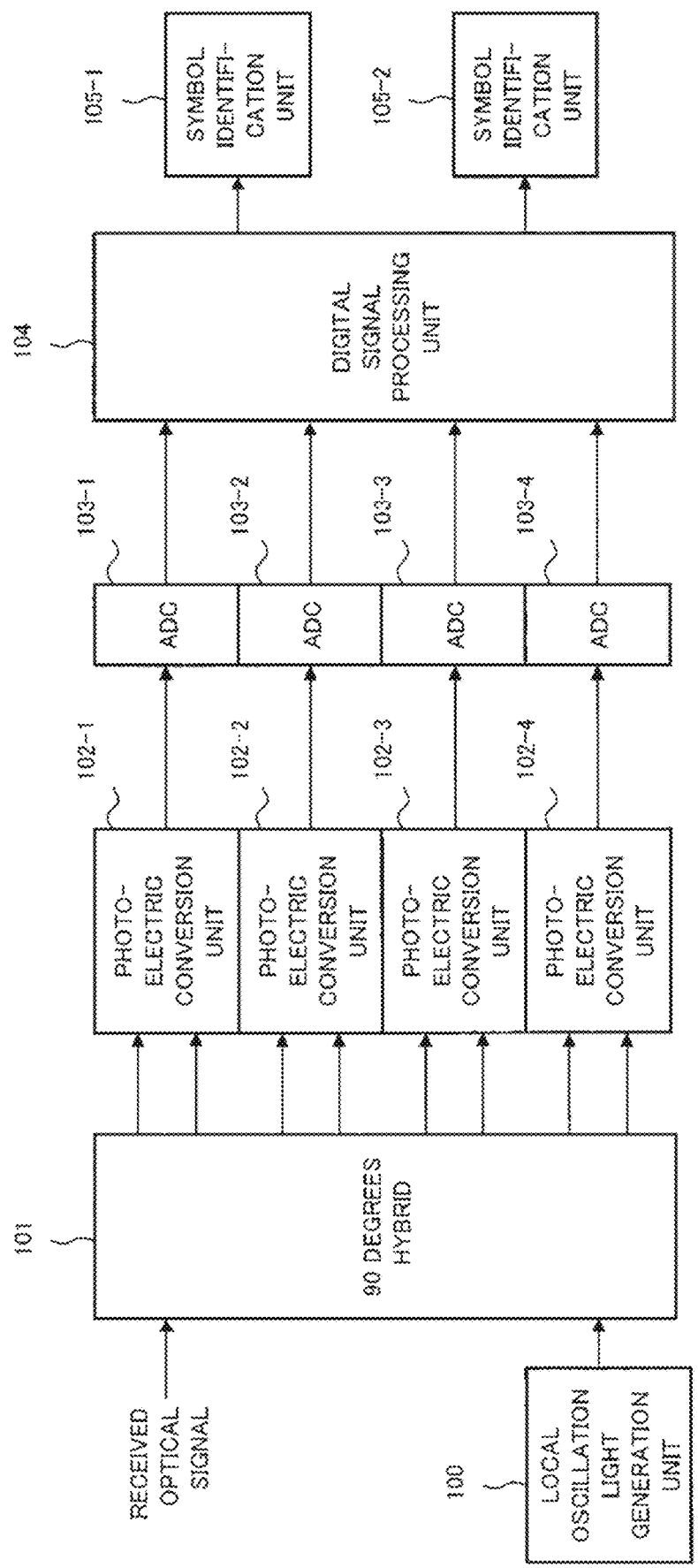
FIG. 1 is a block diagram illustrating a digital coherent optical receiver according to a first exemplary embodiment.

FIG. 1 illustrates a block diagram of an optical receiver based on the digital coherent scheme. The local oscillation light generation unit 100 transmits local oscillation light in the same frequency band shared with the received optical signal. Note that a frequency of optical signals on the transmitter side and a frequency of local oscillation light on the receiver side are predetermined by, for example, the administrator, who makes settings of these frequencies to the respective light sources.

The received optical signal is inputted to 90 degrees hybrid 101 along with local oscillation light that is transmitted from the local oscillation light generation unit 100. The 90 degrees hybrid 101 outputs a total of eight optical signals to photo-electric conversion units 102-1 to 102-4, two signals each, through coherence of the inputted received light signal and the local oscillation light.

The photo-electric conversion units 102-1 to 102-4 each convert the two inputted optical signals into electrical signals and outputs the electrical signals to AD converters (ADCs; analog-to-digital converters) 103-1 to 103-4, respectively.

The AD converters 103-1 to 103-4 convert the inputted analog electrical signals into digital signals and outputs them to a digital signal processing unit 104. From the AD converters 103-1 to 103-4, four digital signals are outputted, which respectively correspond to the real part and imaginary part of a signal component (X polarization signal) parallel to the polarizing axis of the 90 degrees hybrid 101, and the real part and imaginary part of a signal component (Y polarization signal) orthogonal to the polarizing axis of the 90 degrees hybrid 101.

The four digital signals outputted from the AD converters 103-1 to 103-4 undergo demodulation process through the digital signal processing unit 104, and then are recovered into bit strings in symbol identification units 105-1 and 105-2.

Figure 2:
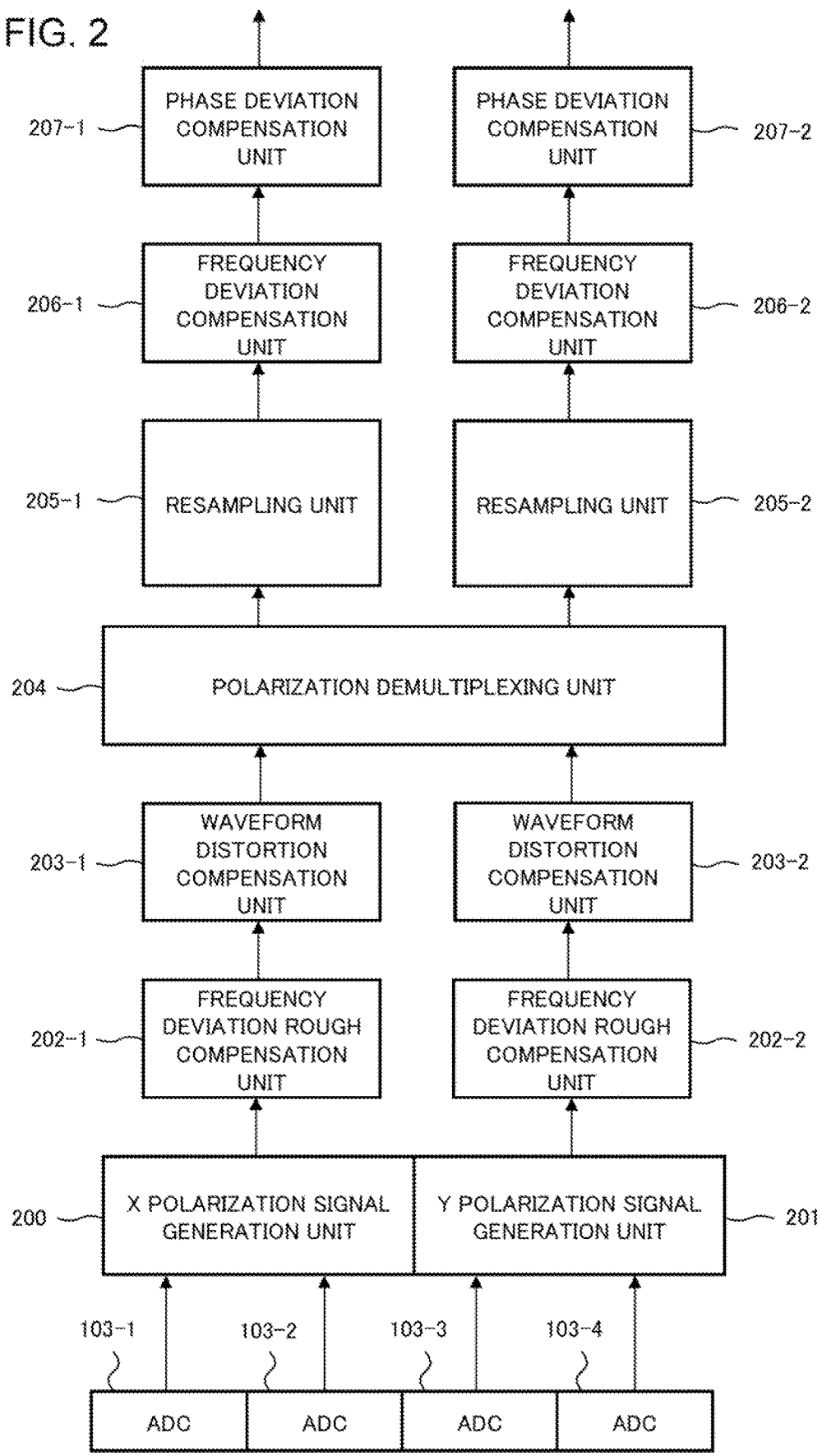
FIG. 2 is a block diagram illustrating the digital signal processing unit 104 according to the first exemplary embodiment.

Now, the following provides detail descriptions of digital signal processing operations performed in the optical receiver based on the digital coherent scheme. FIG. 2 illustrates a block diagram of the digital signal processing unit 104.

An X polarization signal generation unit 200 generates an X polarization signal, which represents a complex number, from the digital signals inputted from the ADCs 103-1 and 103-2, and then outputs the X polarization signal to a frequency deviation rough compensation unit 202-1. On the other hand, a Y polarization signal generation unit 201 generates a Y polarization signal, which represents a complex number, from the digital signals inputted from the ADCs 103-3 and 103-4, and then outputs the Y polarization signal to a frequency deviation rough compensation unit 202-2.

With regard to the inputted polarization signals, the frequency deviation rough compensation units 202-1 and 202-2 compensate for a deviation between the center frequency of the received optical signal and the oscillating frequency of the local oscillation light with rough accuracy. A deviation between the center frequency of a received optical signal and the oscillating frequency of local oscillation light is hereinafter referred to as an optical carrier frequency deviation.

A greater amount of optical carrier frequency deviation may sometimes cause malfunction in a polarization demultiplexing unit 204 situated in a subsequent stage, depending on the type of the phase modulation scheme used for received optical signals or the optical signal-noise (SN) ratio. In addition, if a matched filter is placed in waveform distortion compensation units 203-1 and 203-2 situated in a subsequent stage, a deviation between the received optical signal and the center frequency of the matched filter will degrade signal quality. Note that the frequency deviation rough compensation units 202-1 and 202-2 may be omitted if there is no such problems.

Figure 3:
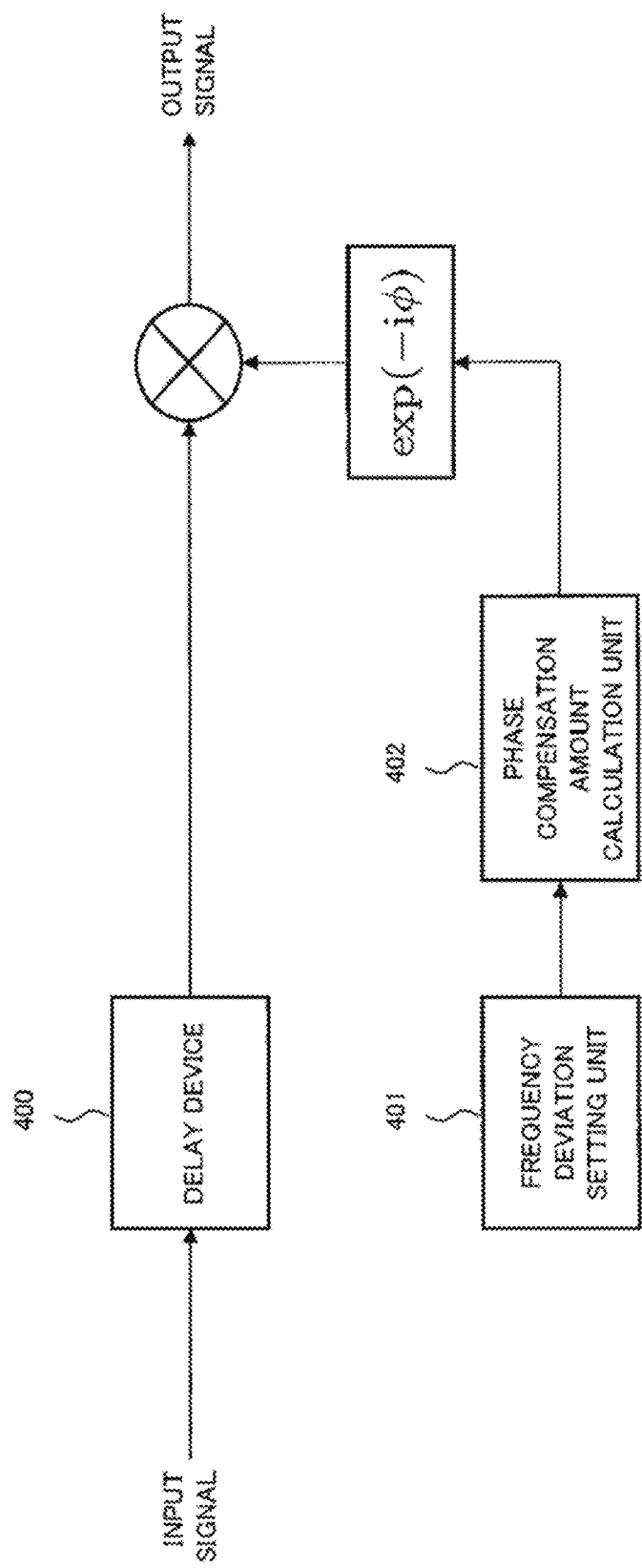
FIG. 3 is a block diagram illustrating the frequency deviation rough compensation unit 202 according to the first exemplary embodiment.

FIG. 3 illustrates a block diagram of the frequency deviation rough compensation unit 202. A frequency deviation setting unit 401 sets a frequency deviation, and a phase compensation amount calculation unit 402 calculates an amount of phase compensation based on the set frequency deviation. An amount of phase compensation is calculated by obtaining the sum of products of a frequency deviation setting value and unit sampling times (inverse numbers of sampling rates for ADCs 103-1 to 103-4).

The input signal inputted to the frequency deviation rough compensation unit 202 waits in a delay device 400 until an amount of phase compensation is calculated. After the amount of phase compensation is calculated, the input signal is subjected to frequency deviation compensation through clockwise (opposite to the positive phase direction) phase rotation by the calculated amount of phase compensation.

Figure 4:
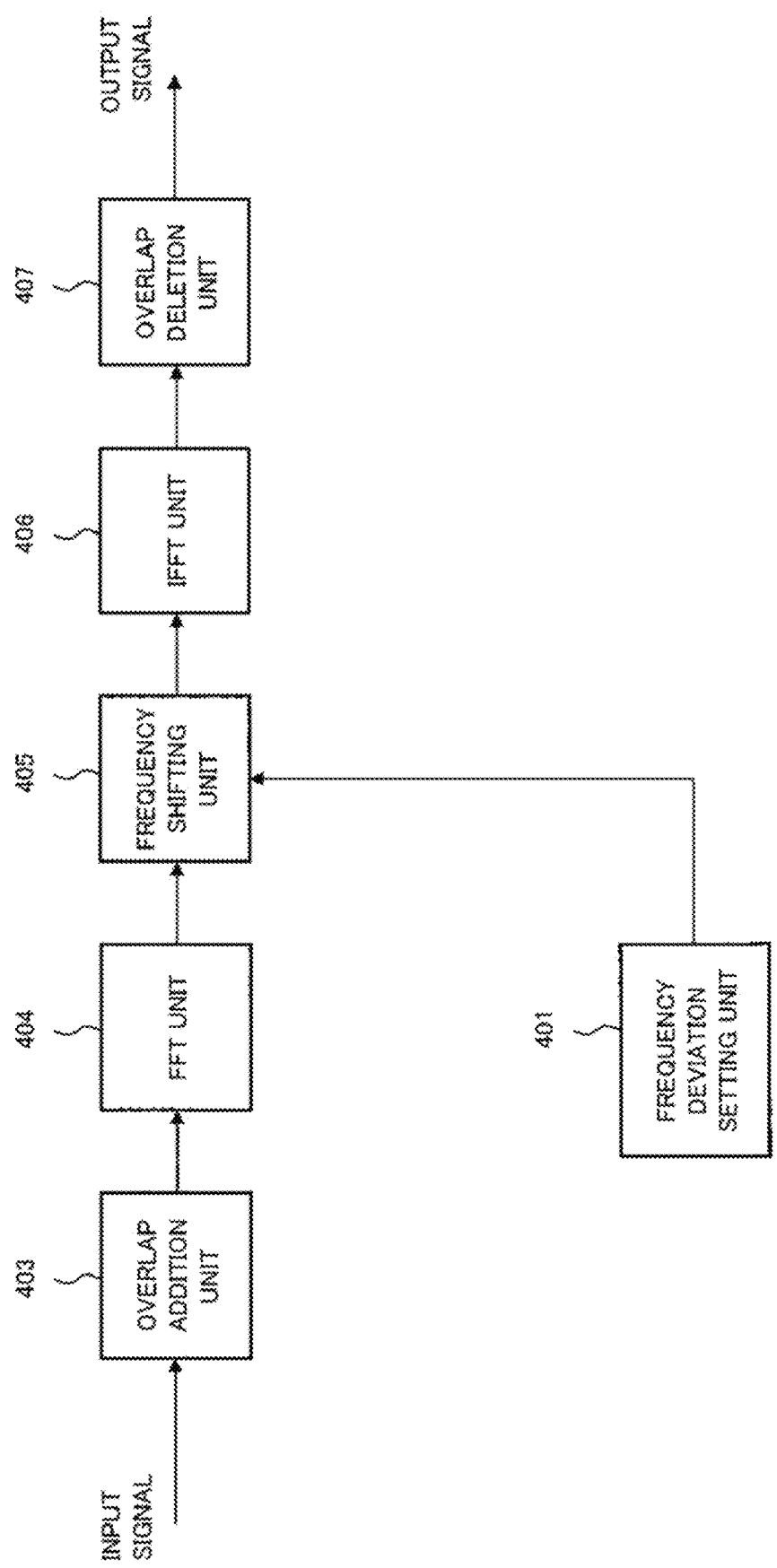
FIG. 4 is another block diagram illustrating the frequency deviation rough compensation unit 202 according to the first exemplary embodiment.

Phase compensation can also be performed by shifting an optical spectrum in frequency direction in frequency domain. FIG. 4 illustrates a block diagram of the frequency deviation rough compensation unit 202, which is configured for this purpose. The frequency deviation rough compensation unit 202 illustrated in FIG. 4 performs phase compensation by shifting an optical spectrum in the frequency direction in the frequency domain. This is called Frequency Domain Equalization (FDE). The FDE-based scheme for optical carrier frequency deviation compensation is effective in reducing a circuit size, owing to the simple process where data need only be shifted in the frequency direction by the amount of frequency deviation compensation, as well as owing to the capability to simultaneously compensate for other linear distortions.

Figure 5:
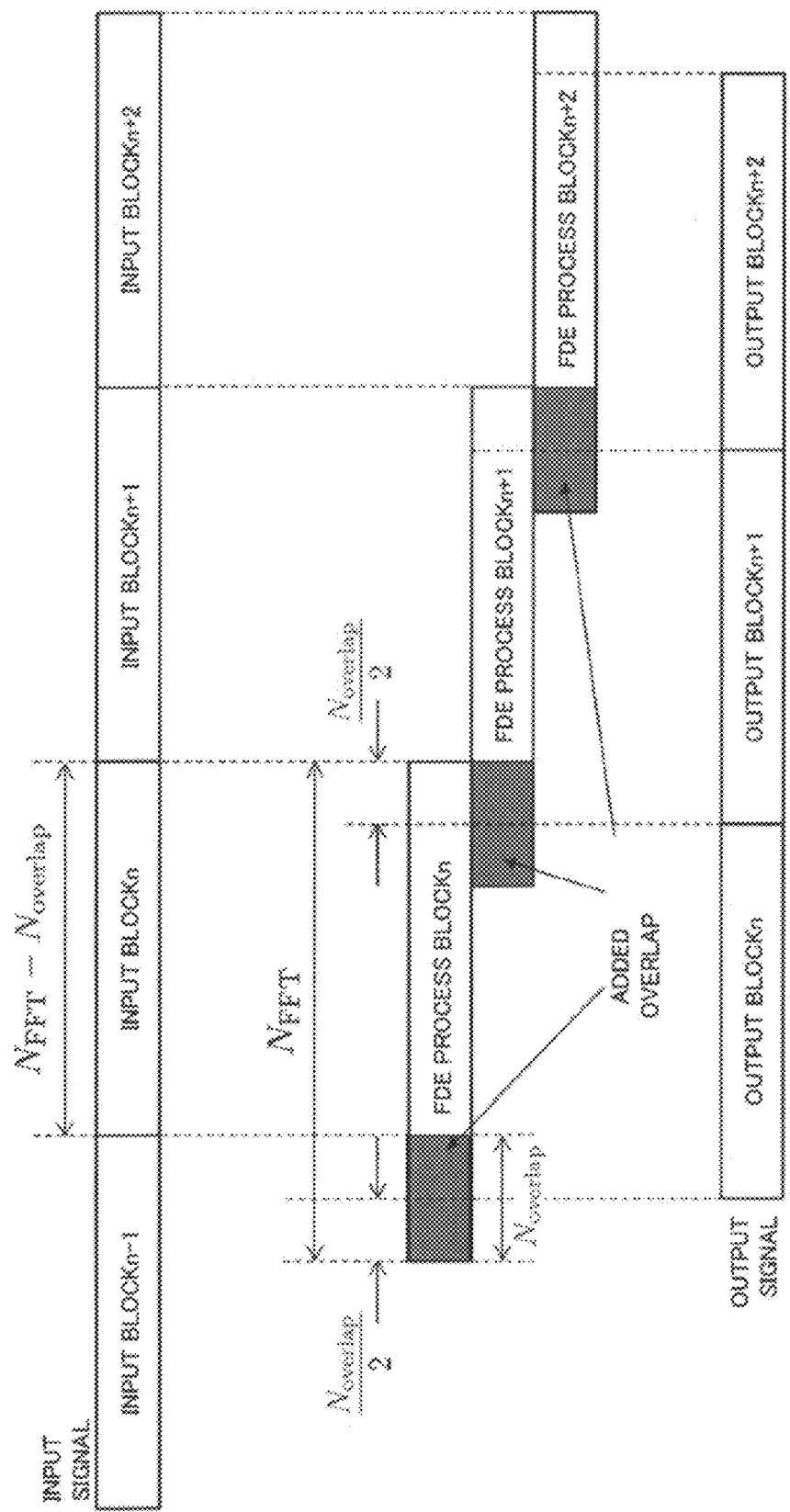
FIG. 5 illustrates example operations of overlap FDE according to the first exemplary embodiment.

As illustrated in FIG. 5, the FDE-based frequency deviation rough compensation unit 202 first divides an input signal into input blocks of a predetermined length. An overlap addition unit 403 combines each of the input blocks with data of a predetermined length (overlap size $N_{overlap}$) in the latter part of the immediately preceding input block. As a result, FDE process blocks, each of which is in data length of the FFT/IFFT window size $N_{FFT}$, are generated.

An FFT unit 404 performs a fast Fourier transform (FFT) on each of the generated FDE process blocks to transform it into a frequency-domain signal. A frequency shifting unit 405 performs frequency shifting on the post-fast Fourier transform FDE process block in the direction opposite to the frequency deviation setting value. Any data on one of the boarders of an FDE process block deviating from the frequency range as a result of the frequency shifting is deleted. On the other hand, zeros depending on the amount of frequency shifting are inserted to the opposite boarder of the FDE process block.

An IFFT unit 406 performs an inverse fast Fourier transform (IFFT) on the FDE process block to re-transform it into a time-domain signal, and outputs the signal to an overlap deletion unit 407. The overlap deletion unit 407 deletes data of half the overlap size from the front and the rear, respectively, of the FDE process block to generate resulting output data.

The overlap addition and deletion processes are performed in order to eliminate a computational distortion caused by the assumption in FFT and IFFT that a signal repeats periodically. The FDE involving the above-described overlap addition and deletion processes is called an overlap FDE scheme.

Figure 6:
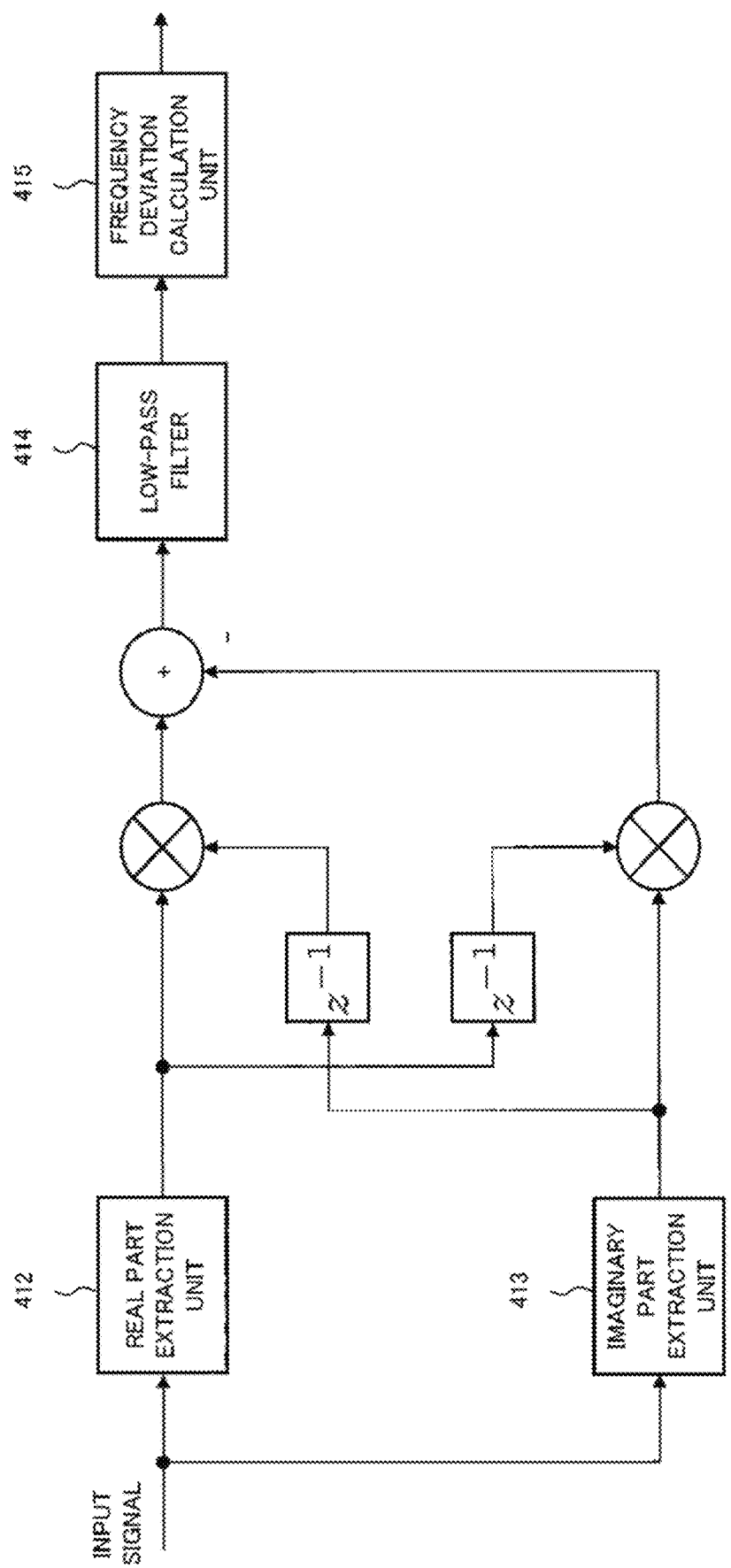
FIG. 6 is a block diagram illustrating the frequency deviation rough compensation unit 202 under the scheme for roughly estimating a frequency deviation as described in NPL 1.

The local oscillation light generation unit 100, which is capable of controlling oscillating frequencies, can also compensate for a frequency deviation by controlling the oscillating frequency of the local oscillation light in the direction opposite to a frequency deviation setting value. This scheme is disclosed in NPL 1 as described in Background Art above. FIG. 6 illustrates a block diagram of the frequency deviation rough compensation unit 202 used for compensating for a frequency deviation in accordance with the scheme described in NPL 1.

In FIG. 6, a real part extraction unit 412 and an imaginary part extraction unit 413 extract the real part and the imaginary part, respectively, of an input signal. Next, a difference between products of the preceding and following two samples is calculated on each of the extracted real part and imaginary part, and then the signal goes through a low-pass filter 414 such as moving average. A frequency deviation calculation unit 415 estimates a frequency deviation from the output value of the low-pass filter 414.

Simulations demonstrate that an output value of the low-pass filter 414 is proportional to a frequency deviation as far as the frequency deviation is within a predetermined range. Accordingly, a frequency deviation can be estimated from the output value of the low-pass filter 414.

Now the digital signal processing unit 104 will be described again with reference to FIG. 2. Waveform distortion compensation units 203-1 and 203-2 perform various compensation processes on the signal inputted from the frequency deviation rough compensation units 202-1 and 202-2 for improving transmission quality, and then outputs the resulting received optical signal to a polarization demultiplexing unit 204. Compensation processes performed by the waveform distortion compensation units 203-1 and 203-2 for improving transmission quality include, for example, wavelength dispersion compensation, waveform shaping through a matched filter, and non-linear waveform distortion compensation.

The polarization demultiplexing unit 204 separates the inputted received optical signal into two digital signals respectively corresponding to two independent optical signals that underwent polarization multiplexing in the optical transmitter, and then individually outputs the separated digital signals to resampling units 205-1 and 205-2. The polarization demultiplexing unit 204 uses an algorithm for polarization demultiplexing, such as Continuous Modulus Algorithm (CMA) or Decision Decided Least Mean Square (DD-LMS).

Each of the resampling units 205-1 and 205-2 converts the inputted digital signal to a signal oversampled by a factor of 1 with optimized sampling timing, and outputs the resulting signal to a frequency deviation compensation unit 206-1 or 206-2. The signals to be inputted to the frequency deviation compensation units 206-1 and 206-2 must be oversampled by a factor of 1. In other words, the resampling units 205-1 and 205-2 may be placed elsewhere before the frequency deviation compensation units 206-1 and 206-2, such as a position preceding the polarization demultiplexing unit 204.

Figure 7:
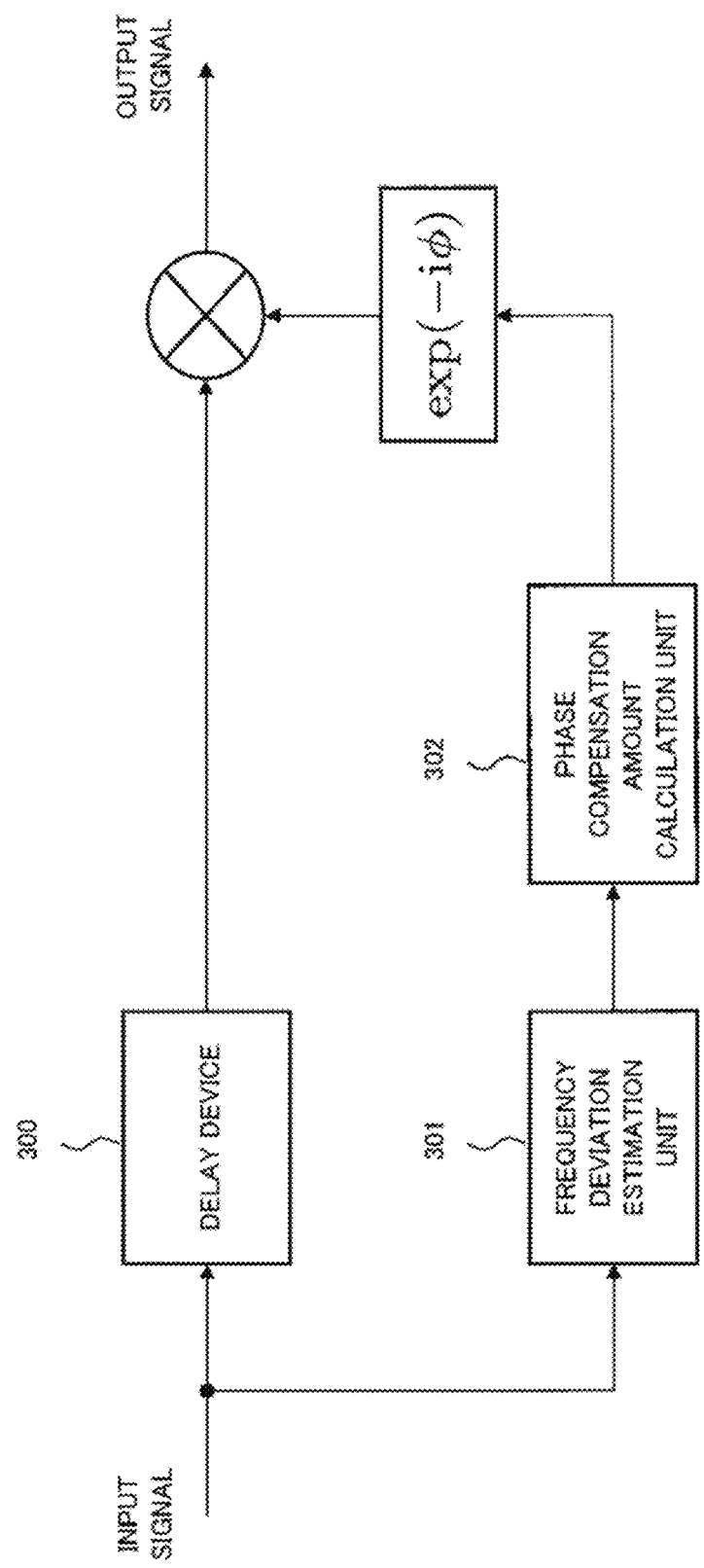
FIG. 7 is a block diagram illustrating the frequency deviation compensation unit 206 according to the first exemplary embodiment.

The frequency deviation compensation units 206-1 and 206-2 completely compensate the inputted signals for any optical carrier frequency deviation which the frequency deviation rough compensation units 202-1 and 202-2 may have failed to compensate for, and then output the resulting signals to phase deviation compensation units 207-1 and 207-2. FIG. 7 illustrates a block diagram of the frequency deviation compensation units 206-1 and 206-2.

Figure 8:
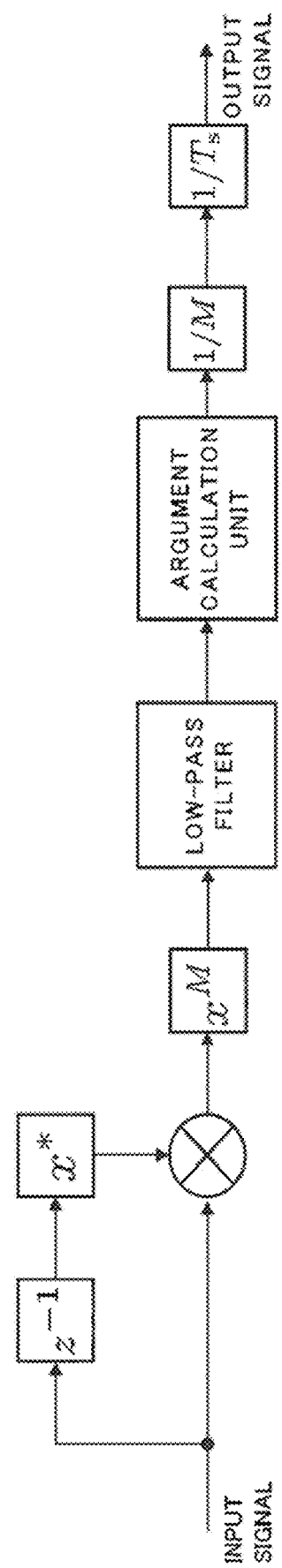
FIG. 8 is a block diagram illustrating the frequency deviation estimation unit 301 according to the first exemplary embodiment.

As illustrated in FIG. 7, the frequency deviation compensation units 206-1 and 206-2 each include a delay device 300, a frequency deviation estimation unit 301, and a phase compensation amount calculation unit 302. A signal inputted to either of the frequency deviation compensation units 206-1 and 206-2 is bifurcated and inputted to the delay device 300 and the frequency deviation estimation unit 301. The frequency deviation setting unit 301 sets a frequency deviation using one part of the bifurcated input signal. FIG. 8 illustrates a block diagram of the frequency deviation estimation unit 301. The frequency deviation estimation unit 301 sets a frequency deviation using M-th power algorithm or Viterbi algorithm. In order to use these algorithms, signals oversampled by a factor of 1 with optimized sampling timing need to be used. In addition, since signals oversampled by a factor of 1 are used, there is a limit imposed on a range of frequency deviations that can be compensated for.

The phase compensation amount calculation unit 302 calculates an amount of phase compensation based on the set frequency deviation, and then gives the calculated amount to the signal inputted to the delay device 300. The signal inputted to the delay device 300 undergoes clockwise (opposite to the positive phase direction) phase rotation by the amount of phase compensation calculated by the phase compensation amount calculation unit 302, thereby the frequency deviation is compensated for, and then the resulting signal is inputted to the phase deviation compensation unit 207-1 or 207-2.

Note that the frequency deviation compensation unit 206 may be configured similarly to the frequency deviation rough compensation unit 202 illustrated in FIG. 3 or FIG. 4. In this case, the frequency deviation compensation unit 206 includes a frequency deviation setting unit instead of the frequency deviation estimation unit 301.

The phase deviation compensation units 207-1 and 207-2 compensate for optical phase deviations of the inputted signals, and output the resulting signals to the symbol identification units 105-1 and 105-2.

The above-described digital coherent scheme that combines an optical phase modulation scheme with a polarization multiplexing and demultiplexing technique can realize a 100 Gbps ultrafast optical communication system.

As described above, the frequency deviation rough compensation unit 202 according to the present exemplary embodiment compensates for a frequency deviation by performing frequency shifting on data in the frequency direction by an amount of frequency deviation compensation. However, if a frequency deviation is compensated for through a frequency-shifting process in the frequency domain in the frequency deviation rough compensation unit 202 described with reference to FIGS. 3, 4, and 6, a phase offset will occur between adjoining blocks to cause an error in the recovered bit string. In particular, there is a risk of temporarily interrupting communications if the employed communication mode is not differential coding.

Figure 9:
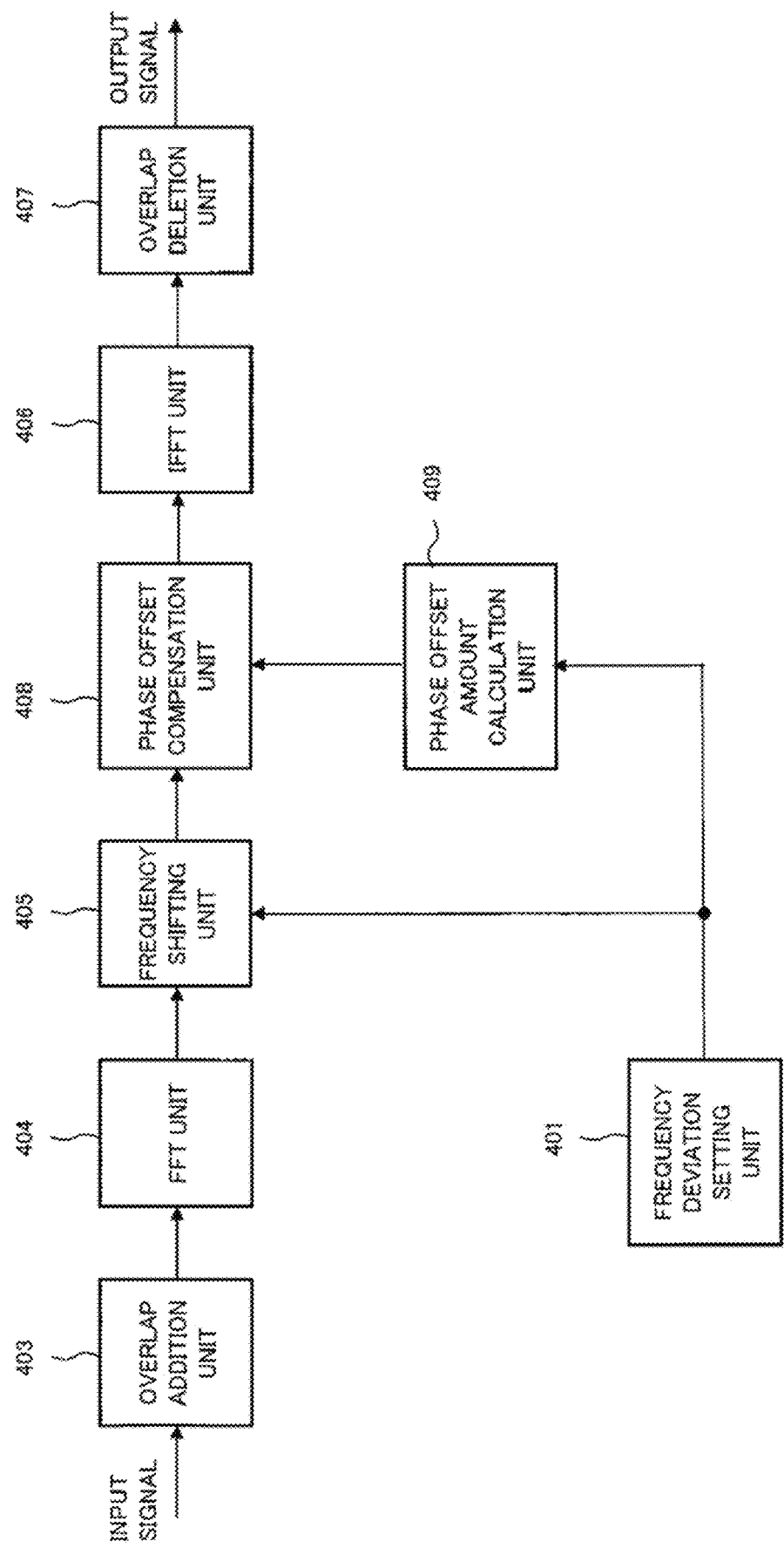
FIG. 9 is another block diagram illustrating the frequency deviation rough compensation unit 202 according to the first exemplary embodiment.

Thus, the present exemplary embodiment solves the above-described problem by providing the frequency deviation rough compensation unit 202 which includes a phase offset compensation unit and a phase offset amount calculation unit. A block diagram of the frequency deviation rough compensation unit 202 according to the present exemplary embodiment is illustrated in FIG. 9. The frequency deviation rough compensation unit 202 in FIG. 9 includes a phase offset compensation unit 408 and a phase offset amount calculation unit 409.

The frequency deviation setting unit 401 outputs a frequency deviation setting value, as an amount of frequency deviation compensation, to the frequency shifting unit 405 and to the phase offset amount calculation unit 409. Assuming here that the overlap FDE process oversamples a signal by a factor of 2, the amount of frequency deviation compensation Δf for frequency shifting can be expressed by Equation 1 with a symbol rate B, an FFT/IFFT window size $N_{FFT}$, and an integer n. Note that the amount of frequency deviation compensation Δf and the amount of a frequency deviation are of opposite sign.

$$\Delta f = \frac{2B}{N_{FFT}} n \qquad \text{Equation 1}$$

In Equation 1, 2B represents a sampling rate w for the overlap FDE process; and n is an integer satisfying $-N_{FFT}/2 \leq n < N_{FFT}/2$.

Next, a phase offset Δφ occurring between the data at the end of data outputted through processing of the nth FDE process block and the data at the beginning of data outputted through processing of the (n+1)th FDE process block can be calculated according to Equation 2.

$$\begin{aligned}\Delta\phi &= 2\pi\Delta f \frac{N_{FFT} - N_{overlap}/2}{2B} - 2\pi\Delta f \frac{N_{overlap}/2}{2B} \qquad \text{Equation 2}\\ &= 2\pi\Delta f \frac{N_{FFT} - N_{overlap}}{2B}\\ &= 2\pi \frac{2B}{N_{FFT}} n \frac{N_{FFT} - N_{overlap}}{2B}\\ &= 2\pi \frac{N_{FFT} - N_{overlap}}{N_{FFT}} n\end{aligned}$$

This equation is derived because the phase offset Δφ is obtained from a difference between the amount of phase rotation caused by the amount of frequency deviation compensation Δf in the nth FDE process block and the amount of phase rotation caused by the amount of frequency deviation compensation Δf in the (n+1)th FDE process block.

A phase offset Δφ is generated every time the FDE process block number is incremented (that is, every time the value n is incremented); therefore, the phase offset Δφ of the mth FDE process block is expressed by Equation 3.

$$\Delta\phi[m] = 2\pi \frac{N_{FFT} - N_{overlap}}{N_{FFT}} n(m - 1) \qquad \text{Equation 3}$$

The phase offset Δφ amount calculation unit 409 calculates a phase offset Δφ based on the circuit parameters having a frequency deviation compensation amount inputted from the frequency deviation setting unit 401, an FFT/IFFT window size, and an overlap size, and then outputs the calculated phase offset to the phase offset compensation unit 408.

The phase offset compensation unit 408 compensates for a phase offset caused by frequency shifting, through inverse rotation by Δφ of the phase of data included in the FDE process block.

Figure 10:
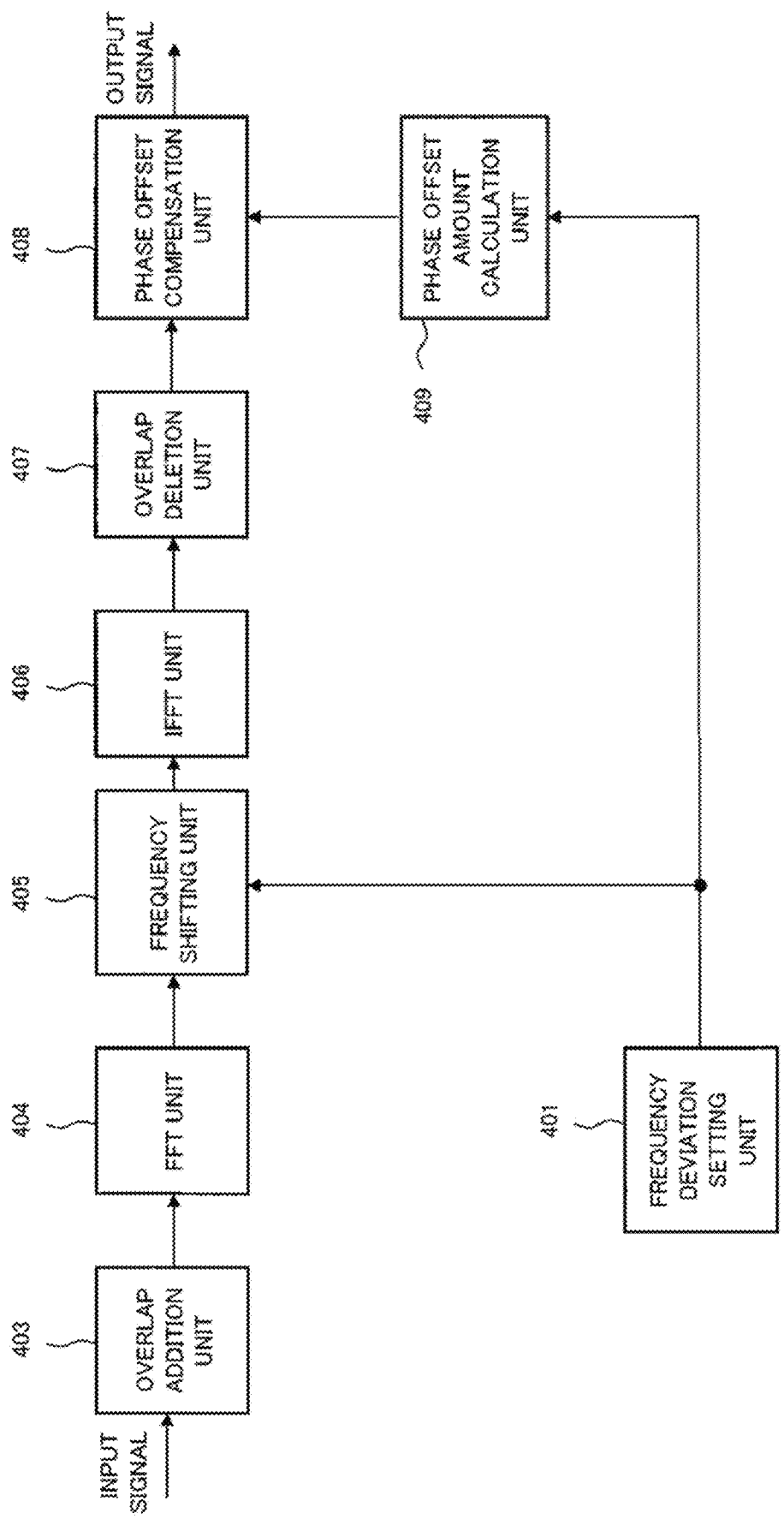
FIG. 10 is another block diagram illustrating the frequency deviation rough compensation unit 202 according to the first exemplary embodiment.

Note that, although the phase offset compensation unit 408 in the frequency deviation rough compensation unit 202 of the present exemplary embodiment performs phase rotation on frequency-domain data, the phase rotation may alternatively be performed on time-domain data. FIG. 10 illustrates a block diagram of the frequency deviation rough compensation unit 202, which is configured for this purpose.

As described above, the frequency deviation rough compensation unit 202 of the present exemplary embodiment includes the phase offset compensation unit 408 and the phase offset amount calculation unit 409, which makes it possible to compensate for a phase offset caused by frequency shifting. This provides the effect of preventing errors that may arise from a phase offset even if a frequency deviation is compensated for through a frequency-shifting process during frequency deviation compensation.

Note that the frequency deviation compensation units 206-1 and 206-2 may be configured similarly to either of the frequency deviation rough compensation units 202 illustrated in FIGS. 9 and 10. In this case, a phase offset caused by frequency shifting can also be compensated for in the frequency deviation compensation unit 206.

Second Exemplary Embodiment

Figure 11:
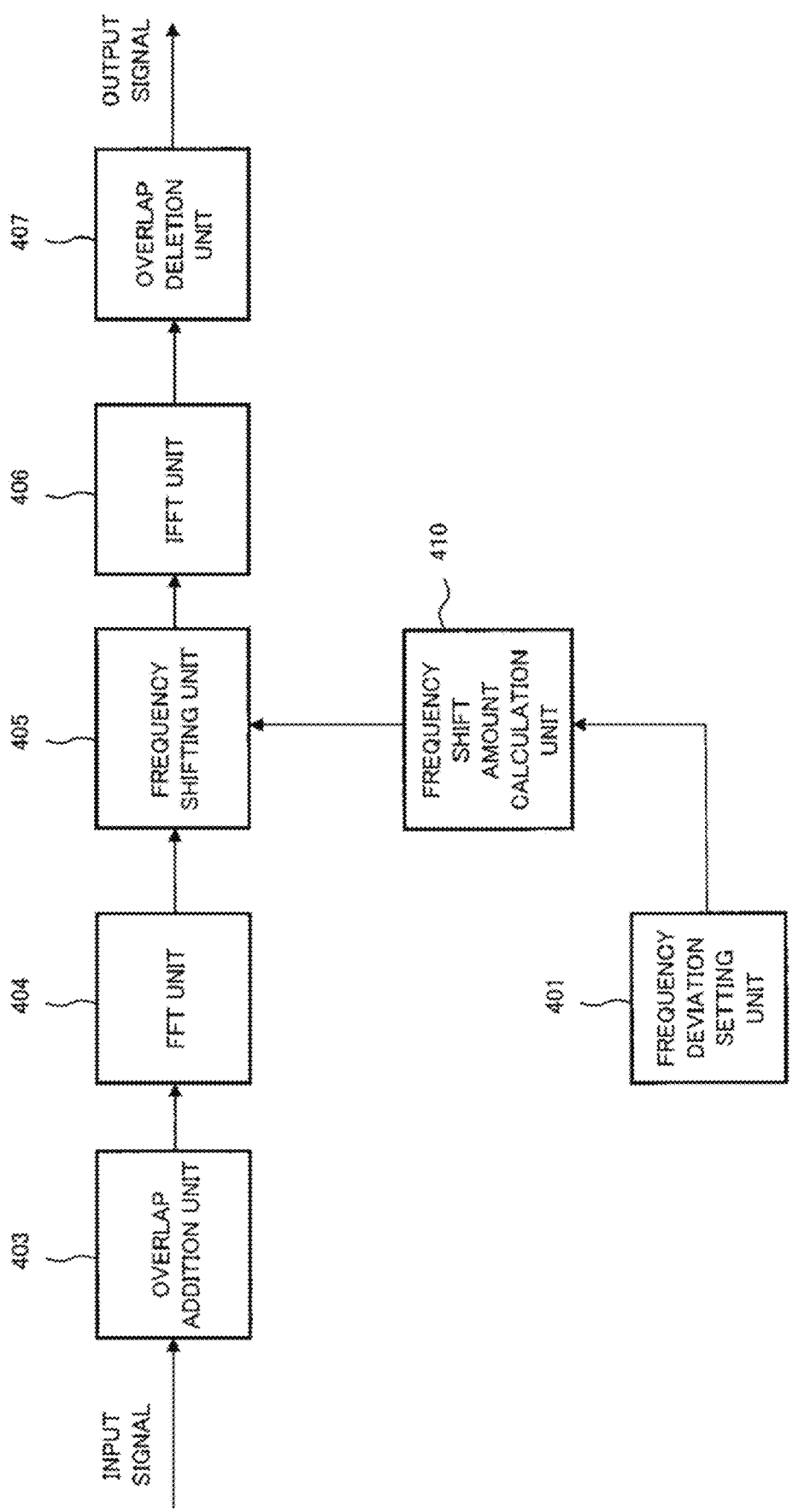
FIG. 11 is a block diagram illustrating the frequency deviation rough compensation unit 202 according to a second exemplary embodiment.

A second exemplary embodiment will now be described. Some descriptions are omitted here for configurations similar to those in the first exemplary embodiment. FIG. 11 illustrates a block diagram of the frequency deviation rough compensation unit 202 according to the present exemplary embodiment. The frequency deviation rough compensation unit 202 in FIG. 11 includes a frequency shift amount calculation unit 410.

The frequency shift amount calculation unit 410 calculates a phase offset Δφ caused by frequency shifting process, based on the amount of frequency deviation Δf inputted from the frequency deviation setting unit 401 and in accordance with Equation 3. The frequency shift amount calculation unit 410 further calculates an amount of frequency deviation Δf' in such a way that the calculated phase offset Δφ is always an integer multiple of 2π, and then notifies the frequency shifting unit 405 of the calculated amount.

For example, if the FFT/IFFT window size is 1,024 and the overlap size is 256, the phase offset according to Equation 3 is represented by Equation 4.

$$\Delta\phi[m] = \frac{3\pi n(m-1)}{2} \qquad \text{Equation 4}$$

Accordingly, as far as n is a multiple of 4, the phase offset Δφ is always an integer multiple of 2π irrespective of the value m.

The frequency shifting unit 405 performs frequency shifting process by using the amount of frequency deviation compensation Δf' inputted from the frequency shift amount calculation unit 410. The phase offset value is now an integer multiple of 2π, which means the phase offset is equivalent to zero, and thus compensation for a phase offset is unnecessary. Any difference between Δf and Δf' will be compensated for in the frequency deviation compensation units 206-1 and 206-2 situated in a later stage.

Figure 12:
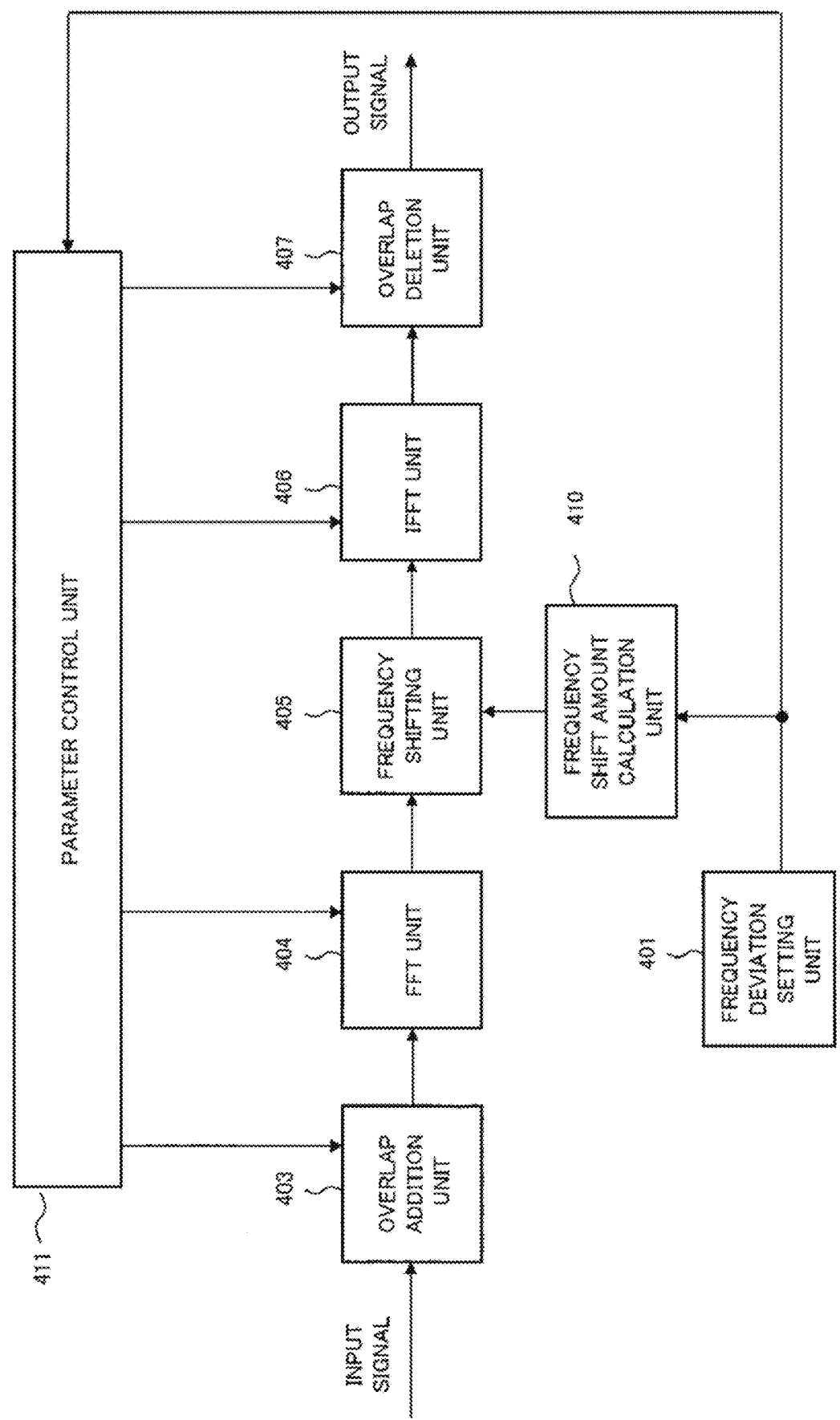
FIG. 12 is another block diagram illustrating the frequency deviation rough compensation unit 202 according to the second exemplary embodiment.

While the present exemplary embodiment described above is configured to adjust the amount of frequency deviation compensation in such a way that the phase offset is an integer multiple of 2π, the frequency deviation rough compensation unit 202 illustrated in FIG. 12 further allows for reduction in a difference between Δf and Δf'. The frequency deviation rough compensation unit 202 in FIG. 12 includes a parameter control unit 411.

The parameter control unit 411 determines a suitable FFT/IFFT window size based on the amount of frequency deviation compensation inputted from the frequency deviation setting unit 401, and outputs the determined size to the FFT unit 404 and/or the IFFT unit 406. The FFT unit 404 and/or the IFFT unit 406 adjusts the FFT/IFFT window size for an input signal to the FFT/IFFT window size that has been inputted from the parameter control unit 411.

In addition, the parameter control unit 411 determines a suitable overlap size based on the amount of frequency deviation compensation inputted from the frequency deviation setting unit 401, and outputs the determined size to the overlap addition unit 403. The overlap addition unit 403 adjusts the overlap size for an input signal to the overlap size that has been inputted from the parameter control unit 411.

The frequency deviation rough compensation unit 202 in FIG. 12 can reduce a difference between Δf and Δf' because of adjusting the FFT/IFFT window size and the overlap size based on an amount of frequency deviation compensation.

The present exemplary embodiment makes it possible to compensate for a phase offset caused by frequency shifting. Consequently, there is provided the effect of preventing errors that may arise from a phase offset even if a frequency deviation is compensated for through a frequency-shifting process during frequency deviation compensation.

Third Exemplary Embodiment

Figure 13:
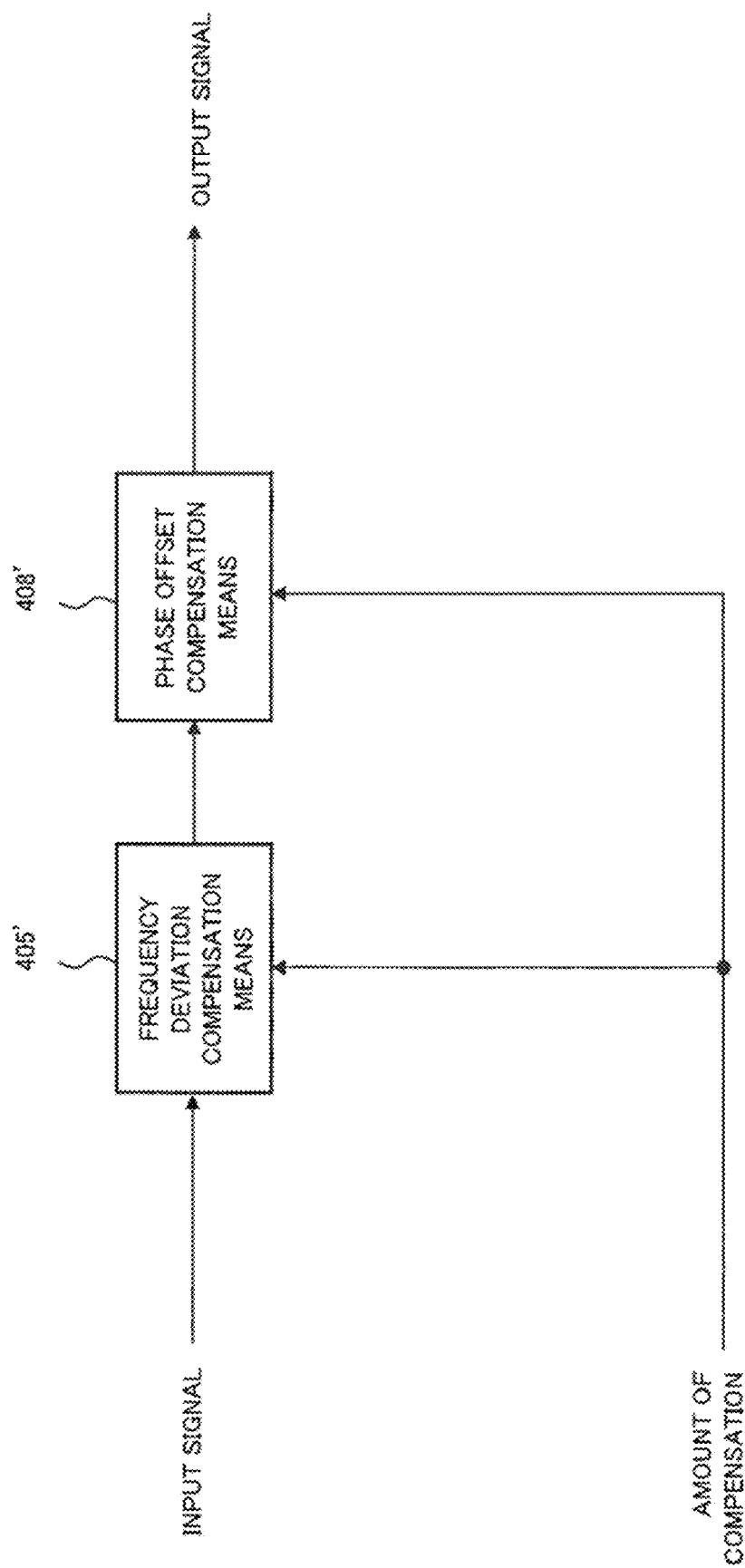
FIG. 13 is a block diagram illustrating the frequency deviation rough compensation unit 202 according to a third exemplary embodiment.

A third exemplary embodiment will now be described with reference to the drawings. Some descriptions are omitted here for configurations similar to those in the first and second exemplary embodiments. FIG. 13 illustrates a block diagram of the frequency deviation rough compensation unit 202 according to the present exemplary embodiment. As illustrated in FIG. 13, the frequency deviation rough compensation unit 202 includes frequency deviation compensation means 405' and phase offset compensation means 408'. Note that the frequency deviation compensation means 405' corresponds to the frequency shifting unit 405 of the first and second exemplary embodiments, while the phase offset compensation means 408' corresponds to the phase offset compensation unit 408 of the first exemplary embodiment.

The frequency deviation compensation means 405' compensates for a frequency deviation of a frequency-domain signal by, for example, shifting the signal in the frequency direction. The phase offset compensation means 408' compensates for a phase offset caused by shifting the signal in the frequency direction by, for example, inversely rotating the phase of the signal by the phase offset.

The frequency deviation rough compensation unit 202 according to the present exemplary embodiment includes the phase offset compensation unit 408', which makes it possible to compensate for a phase offset caused by shifting a signal in the frequency direction.

Fourth Exemplary Embodiment

Figure 14:
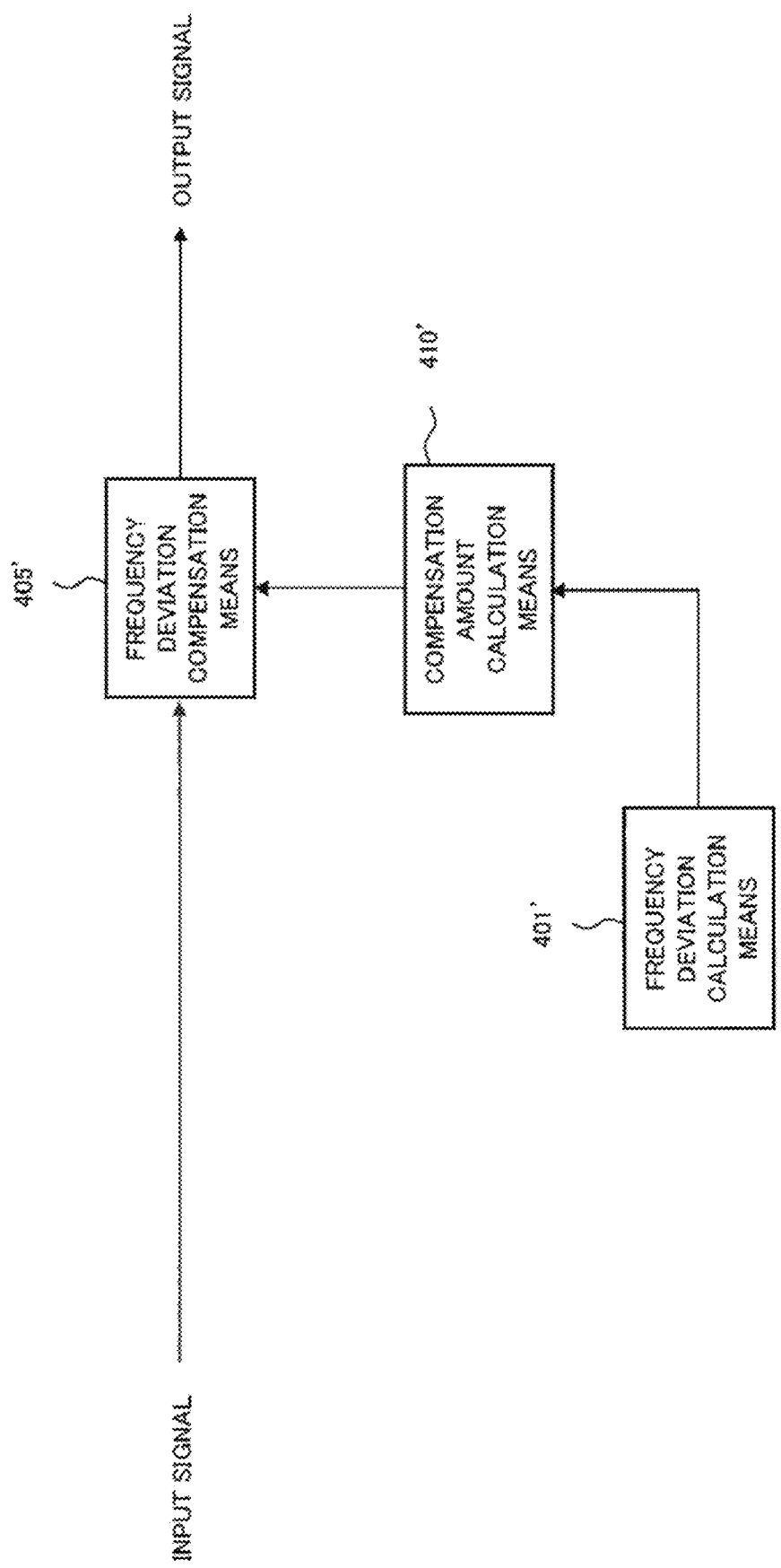
FIG. 14 is a block diagram illustrating the frequency deviation rough compensation unit 202 according to a fourth exemplary embodiment.

A fourth exemplary embodiment will now be described with reference to the drawings. Some descriptions are omitted here for configurations similar to those in the first to third exemplary embodiments. FIG. 14 illustrates a block diagram of the frequency deviation rough compensation unit 202 according to the present exemplary embodiment. As illustrated in FIG. 14, the frequency deviation rough compensation unit 202 includes frequency deviation compensation means 405', frequency deviation calculation means 401', and compensation amount calculation means 410'. Note that the frequency deviation compensation means 405' corresponds to the frequency shifting unit 405 of the first and second exemplary embodiments. Also note that the compensation amount calculation means 410' corresponds to the frequency shift amount calculation unit 410 of the first and second exemplary embodiments.

The frequency deviation calculation means 401' calculates an amount of frequency deviation compensation in a frequency-domain signal, and then outputs the calculated amount to the compensation amount calculation means 410'.

The compensation amount calculation means 410' calculates a phase offset Δφ caused by frequency shifting, based on the inputted amount of frequency deviation Δf, and then calculates an amount of frequency deviation Δf' in such a way that the phase offset Δφ is always an integer multiple of 2π. The compensation amount calculation means 410' outputs the calculated amount of frequency deviation Δf' to the frequency deviation compensation means 405'.

The frequency deviation compensation means 405' compensates for a frequency deviation of the signal based on the inputted amount of frequency deviation Δf'. Note that the frequency deviation compensation means 405' compensates for a frequency deviation of the signal by, for example, shifting the signal in the frequency direction.

The present exemplary embodiment makes it possible to compensate for a phase offset caused by shifting a signal in the frequency direction during frequency deviation compensation.

Fifth Exemplary Embodiment

A fifth exemplary embodiment will now be described. The optical receiver according to the present exemplary embodiment is configured similarly to the optical receiver in FIG. 1 and includes the digital signal processing unit 104 illustrated in FIG. 2. In the present exemplary embodiment, the frequency deviation rough compensation units 202-1 and 202-2 compensate for a frequency deviation by the amount of frequency deviation compensation which has been set by the frequency deviation setting unit 401. On the other hand, the frequency deviation compensation units 206-1 and 206-2 compensate for a frequency deviation while dynamically changing an amount of frequency deviation compensation.

In the digital coherent scheme, if an amount of frequency deviation compensation is dynamically changed, a phase offset will occur between adjoining blocks to cause an error in the recovered bit string. In particular, there is a risk of temporarily interrupting communications if the employed communication mode is not differential coding.

Figure 15:
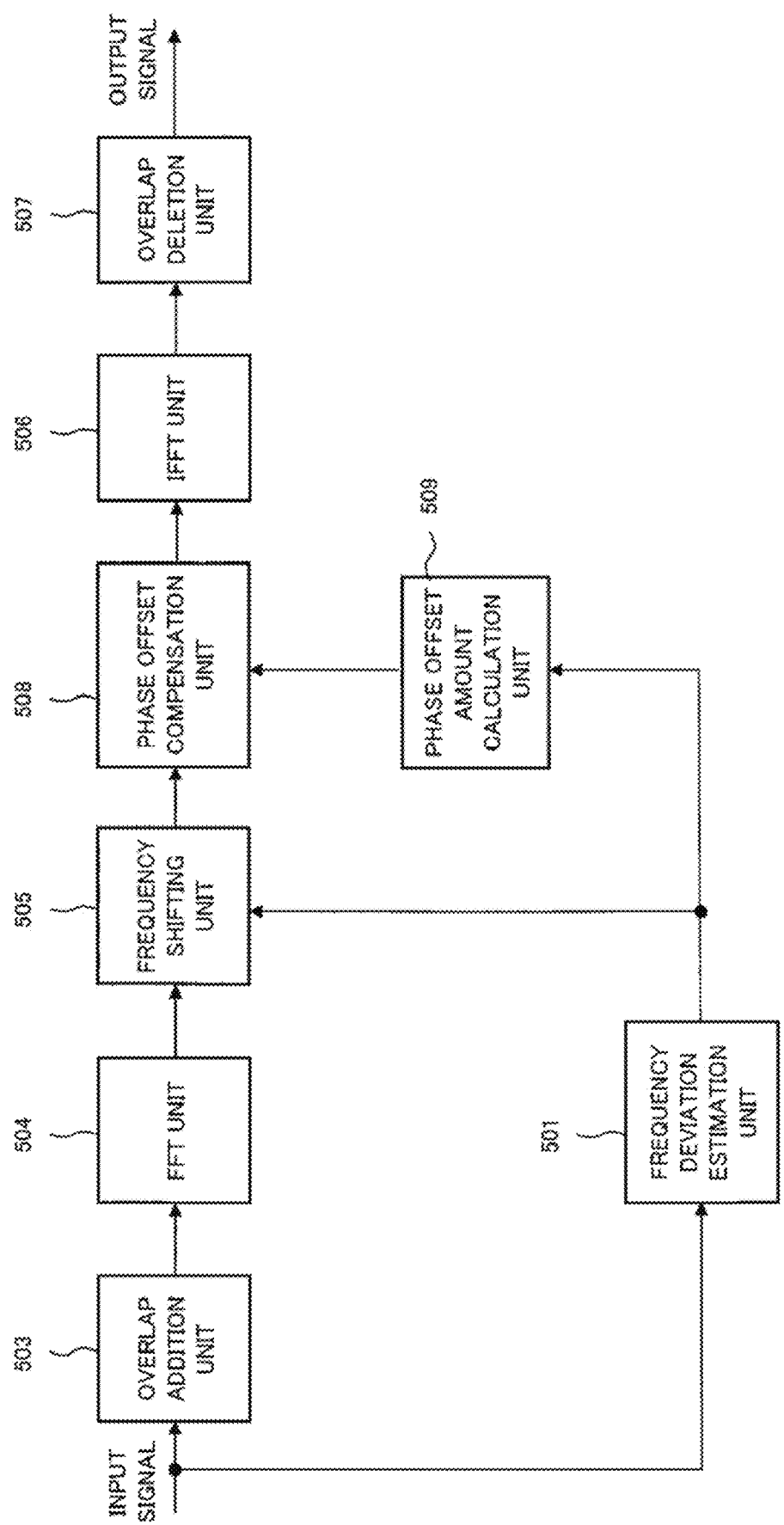
FIG. 15 is a block diagram illustrating the frequency deviation compensation unit 206 according to a fifth exemplary embodiment.

Thus, in the present exemplary embodiment, the frequency deviation compensation unit 206 includes a function to compensate for a phase offset caused by change in an amount of frequency deviation compensation, thereby preventing errors that may arise from a phase offset even when the amount of frequency deviation compensation is dynamically changed. FIG. 15 illustrates a block diagram of the frequency deviation compensation unit 206, which is configured for this purpose.

With reference to FIG. 15, the overlap addition unit 503 functions in the same manner as the overlap addition unit 403 in the frequency deviation rough compensation unit 202 illustrated in FIG. 9. The FFT unit 504, the frequency shifting unit 505, the IFFT unit 506, the overlap deletion unit 507, and the phase offset compensation unit 508 function in the same manner as the FFT unit 404, the frequency shifting unit 405, the IFFT unit 406, the overlap deletion unit 407, and the phase offset compensation unit 408, respectively.

The frequency deviation estimation unit 501 outputs a frequency deviation estimated value, as an amount of frequency deviation compensation, to the frequency shifting unit 505 and to the phase offset amount calculation unit 509. Assuming that $\Delta f_n$ represents the amount of frequency deviation compensation in the FDE process block n, $\Delta f_{n+1}$ represents the amount of frequency deviation compensation in the FDE process block n+1, and $\Delta f_{n+1} - \Delta f_n$ represents an amount of change in the amount of frequency deviation compensation, $\Delta f$ is expressed by Equation 5 with a sampling rate fs, an FFT/IFFT window size $N_{FFT}$, and an integer n.

$$\Delta f = \Delta f_{n+1} - \Delta f_n = \frac{f_s}{N_{FFT}} n \qquad \text{Equation 5}$$

In addition, a phase offset between the data at the end of an output block for the FDE process block n and the data at the beginning of an output block for the FDE process block n+1 can be calculated according to Equation 6. Equation 6 represents that the signal phase advances by $\Delta f$ in the FDE process block n+1.

$$\Delta \phi = 2\pi \Delta f \frac{N_{overlap}/2}{f_{ws}} = \pi \frac{N_{overlap}}{N_{FFT}} n \qquad \text{Equation 6}$$

The phase offset amount calculation unit 509 calculates a phase offset $\Delta \varphi$ based on the circuit parameters having the inputted frequency deviation compensation amount, the FFT/IFFT window size, and the overlap size, and then outputs the calculated phase offset to the phase offset compensation unit 508.

The phase offset compensation unit 508 compensates for a phase offset caused by change in the amount of frequency deviation compensation, by inversely (clockwise) rotating the phase of data included in the FDE process block n+1 by the phase offset $\Delta \varphi$.

Figure 16:
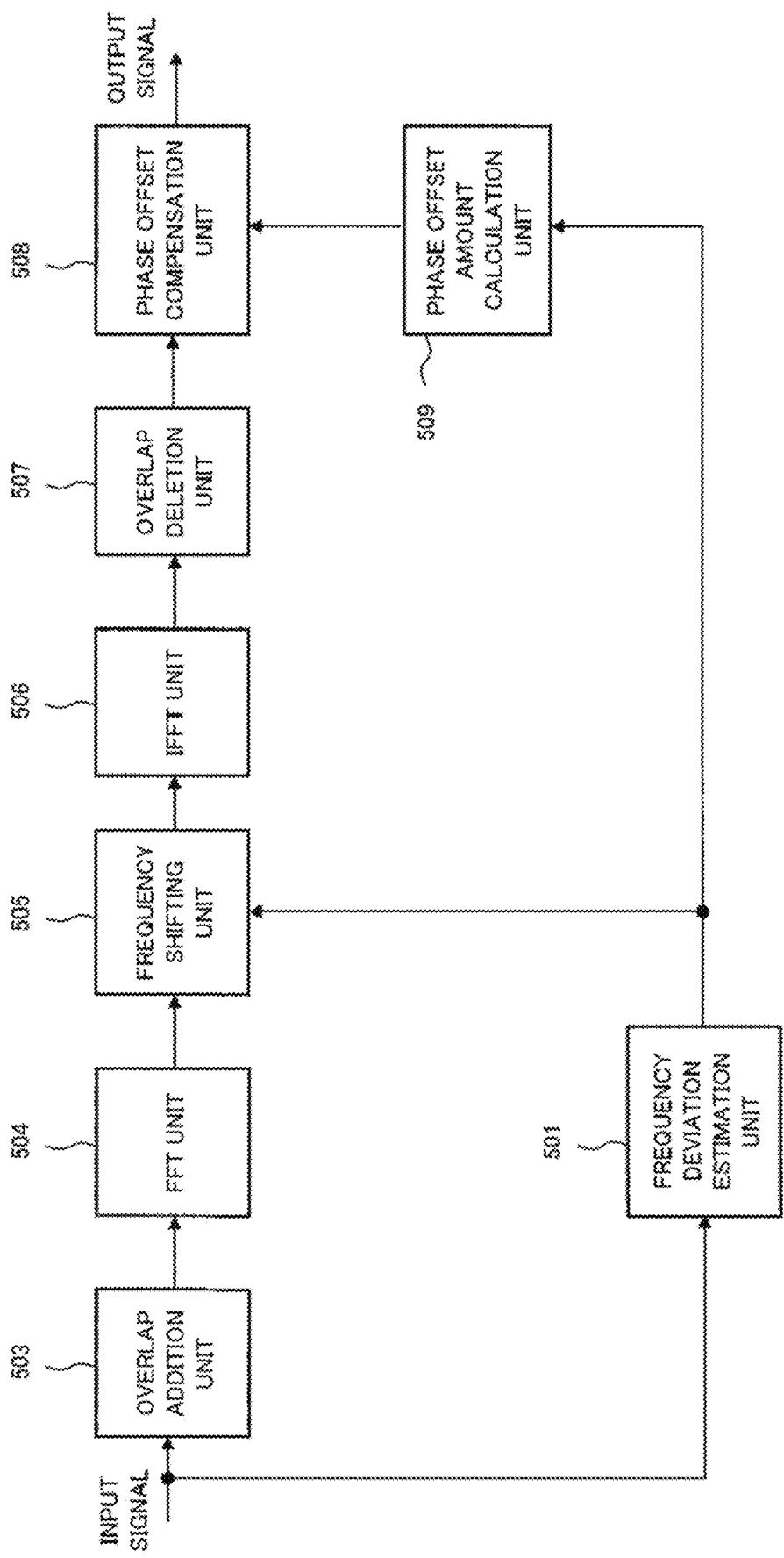
FIG. 16 is another block diagram illustrating the frequency deviation compensation unit 206 according to the fifth exemplary embodiment.

In the frequency deviation compensation unit 206 illustrated in FIG. 15, the phase offset compensation unit 508 performs phase rotation on frequency-domain data; however, the phase offset compensation unit 508 may also perform phase rotation on time-domain data. FIG. 16 illustrates a block diagram of the frequency deviation compensation unit 206, which is configured for this purpose.

Figure 17:
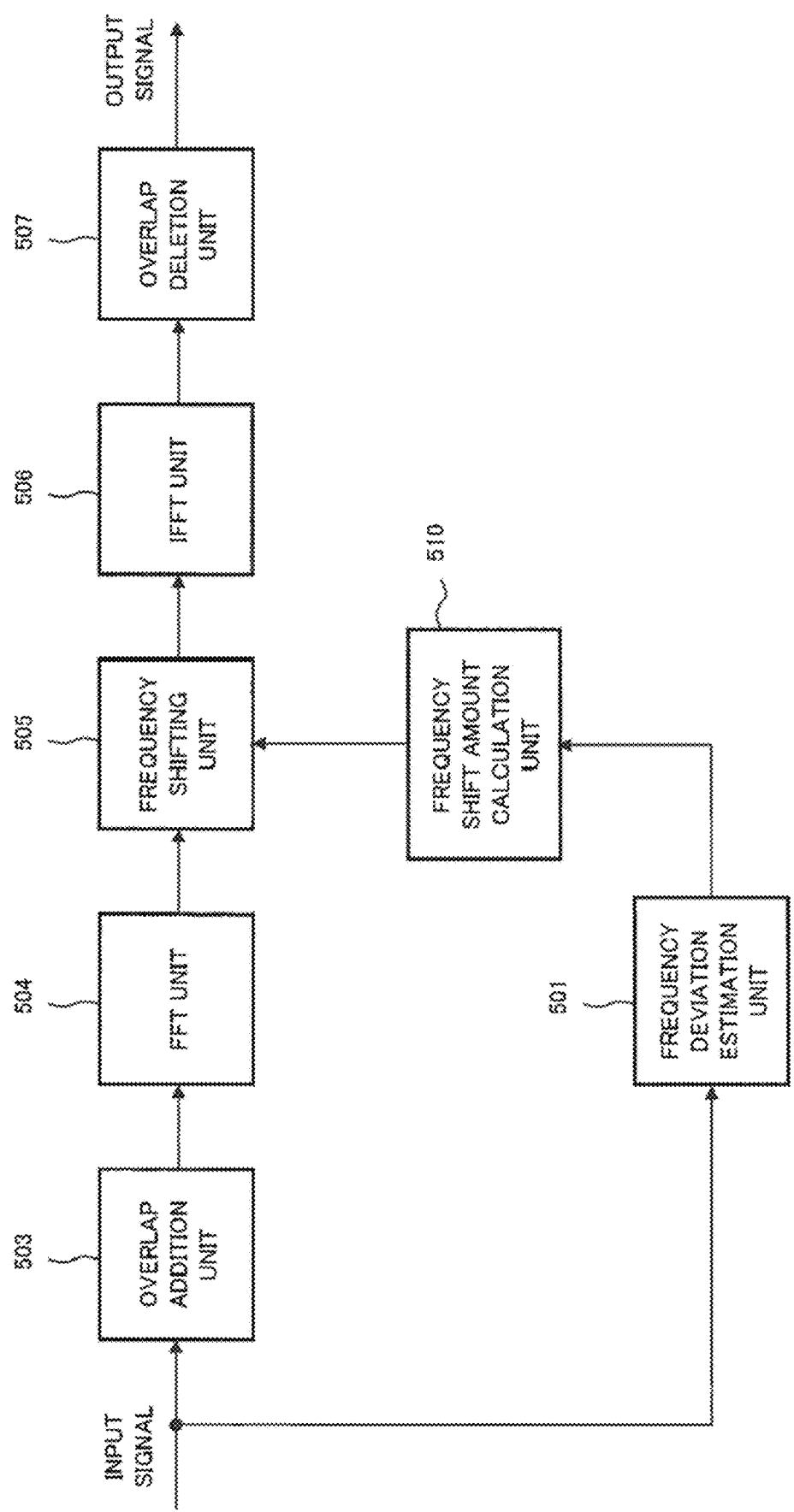
FIG. 17 is another block diagram illustrating the frequency deviation compensation unit 206 according to the fifth exemplary embodiment.

In addition, the frequency deviation compensation unit 206 may be configured as illustrated in FIG. 17. The frequency deviation compensation unit 206 in FIG. 17 includes a frequency shift amount calculation unit 510.

The frequency shift amount calculation unit 510 calculates, based on the amount of frequency deviation compensation inputted from the frequency deviation estimation unit 501 and in accordance with Equation 2, a phase offset caused by change in the amount of frequency deviation compensation, and approximates the phase offset to a value $\Delta \varphi'$ that is closest to the phase offset value among integer multiples of $2\pi$. The frequency shift amount calculation unit 510 calculates an amount of change $\Delta f'$ in the amount of frequency deviation compensation corresponding to $\Delta \varphi'$ by using Equation 2, as well as calculating a new amount of frequency deviation compensation $\Delta f_{n+1}' = f_n \Delta f'$ by using Equation 1, and then outputs $\Delta f_{n+1}'$, an amount of frequency deviation compensation, to the frequency shifting unit 505.

The frequency shifting unit 505 performs frequency shifting by using the inputted amount of frequency deviation compensation $\Delta f_{n+1}'$, on the other hand, compensation for a phase offset is unnecessary because the phase offset is an integer multiple of $2\pi$, which means the phase offset is equivalent to zero.

In addition, assuming that the FFT/IFFT window size is 1,024 and the overlap size is 256, the phase offset is always an integer multiple of $\pi/4$. If n is a multiple of 8, the phase offset is an integer multiple of $2\pi$, and thus the phase offset is equivalent to zero. Thus, in accordance with Equation 1, as far as the amount of frequency deviation compensation $\Delta f_n$ is limited beforehand to a product of a value obtained by dividing the sampling rate by the FFT/IFFT window size and a multiple of 8, the phase offset is always an integer multiple of $2\pi$, representing that no problem is caused by a phase offset.

While the present exemplary embodiment described above is configured to adjust the amount of frequency deviation compensation in such a way that a phase offset is an integer multiple of $2\pi$, the frequency deviation compensation unit 206 illustrated in FIG. 18 further allows for reduction in a difference between $\Delta f_{n+1}$ and $\Delta f_{n+1}'$.

With reference to FIG. 18, the parameter control unit 511 determines a suitable FFT/IFFT window size based on the amount of frequency deviation compensation inputted from the frequency deviation estimation unit 501, and outputs the determined size to the FFT unit 504 and/or the IFFT unit 506. The FFT unit 504 and/or the IFFT unit 506 adjusts the FFT/IFFT window size for an input signal to the FFT/IFFT window size that has been inputted from the parameter control unit 511.

In addition, the parameter control unit 511 determines a suitable overlap size based on the amount of frequency deviation compensation inputted from the frequency deviation estimation unit 501, and outputs the determined size to the overlap addition unit 503. The overlap addition unit 503 adjusts the overlap size for an input signal to the overlap size that has been inputted from the parameter control unit 511.

The frequency deviation compensation unit 206 in FIG. 18 can reduce a difference between $\Delta f_{n+1}$ and $\Delta f_{n+1}'$ because of adjusting the FFT/IFFT window size and the overlap size based on an amount of frequency deviation compensation.

In the present exemplary embodiment, the frequency deviation rough compensation units 202-1 and 202-2 are configured similarly to any one illustrated in FIGS. 9 to 12, which makes it possible to compensate for a phase offset caused by frequency shifting. In addition, the frequency deviation compensation units 206-1 and 206-2 have a configuration illustrated in any one of FIGS. 15 to 18, which makes it possible to compensate for a phase offset caused when the amount of frequency deviation compensation is dynamically changed during frequency deviation compensation.

Consequently, the present exemplary embodiment provides the effect of compensating for a frequency deviation by performing a frequency-shifting process during frequency deviation rough compensation, as well as providing the effect of preventing errors that may arise from a phase offset even when the amount of frequency deviation compensation is dynamically changed during frequency deviation compensation.

Alternatively, the frequency deviation rough compensation units 202-1 and 202-2 may compensate for a frequency deviation by dynamically changing the amount of frequency deviation compensation, while the frequency deviation compensation units 206-1 and 206-2 may compensate for a frequency deviation by the amount of frequency deviation compensation set by the frequency deviation setting unit. In this case, the frequency deviation compensation units 206-1 and 206-2 are configured similarly to any one illustrated in FIGS. 9 to 12, while the frequency deviation rough compensation units 202-1 and 202-2 are configured similarly to any one illustrated in FIGS. 15 to 18.

Sixth Exemplary Embodiment

A sixth exemplary embodiment will now be described. According to the present exemplary embodiment, a computer, central processing unit (CPU), micro-processing unit (MPU), or the like for an optical receiver executes the software (program) that implements functions of the above-described individual exemplary embodiments. The optical receiver obtains the software (program) that implements functions of the above-described individual exemplary embodiments via any of various storage media such as CD-R (Compact Disc Recordable) or via a network. A program obtained by the optical receiver or a storage medium storing the program is part of the present invention. Note that the software (program) may be stored, for example, in advance in a predetermined storage unit included in the optical receiver.

The computer, CPU, MPU, or the like for the optical receiver reads out a program code from the obtained software (program) and executes it. Accordingly, the optical receiver performs the same processes as those for an optical receiver according to the above-described individual exemplary embodiments.

The above-described exemplary embodiments represent processes performed after an optical signal is converted to an electrical signal, and are applicable to any optical modulation scheme that can be applied to optical transmissions (optical communications).

The present invention is not limited to the above exemplary embodiments and includes design changes and the like that do not depart from the gist of the present invention. The whole or part of the above exemplary embodiments can be described as, but is not limited to, the following supplementary notes.

[Supplementary Note 1]
A frequency deviation compensation scheme including:
a frequency deviation compensation means for compensating for, by frequency shifting, a frequency deviation caused to a signal; and a phase offset compensation means for compensating for a phase offset caused to the signal due to the frequency shifting.

[Supplementary Note 2]
The frequency deviation compensation scheme according to Supplementary Note 1,
wherein the phase offset compensation means compensates for the phase offset by inversely rotating the phase of the signal by the phase offset.

[Supplementary Note 3]
The frequency deviation compensation scheme according to Supplementary Note 1 or 2, further including:
a phase offset calculation means for calculating a phase offset caused to the signal due to the frequency shifting,
wherein the phase offset compensation means compensates for the phase offset of the signal based on the calculated phase offset.

[Supplementary Note 4]
The frequency deviation compensation scheme according to Supplementary Note 3, further including:
a frequency deviation calculation unit for calculating an amount of frequency deviation compensation in the signal, wherein the frequency deviation compensation means compensates for the frequency deviation of the signal based on the calculated amount of frequency deviation compensation, and
wherein the phase offset calculation means calculates the phase offset based on the calculated amount of frequency deviation compensation.

[Supplementary Note 5]
The frequency deviation compensation scheme according to Supplementary Note 4,
wherein the frequency deviation calculation unit calculates an amount of frequency deviation compensation for each of a plurality of blocks into which the signal is divided,
wherein the frequency deviation compensation means compensates for a frequency deviation for each of the plurality of blocks, based on the calculated amount of frequency deviation compensation, and
wherein the phase offset compensation means compensates for the phase offset which arises from a difference between an amount of phase rotation corresponding to an amount of frequency deviation compensation of one of the blocks and an amount of phase rotation corresponding to an amount of frequency deviation compensation of another block adjacent to the block.

[Supplementary Note 6]
The frequency deviation compensation scheme according to any one of Supplementary Notes 3 to 5,
wherein the phase offset calculation means calculates the phase offset based on the amount of frequency deviation compensation, an FFT/IFFT window size, and an overlap size.

[Supplementary Note 7]
The frequency deviation compensation scheme according to any one of Supplementary Notes 1 to 6,
wherein the phase offset compensation means compensates for the phase offset by inversely rotating the phase of the signal in a frequency domain by the phase offset.

[Supplementary Note 8]
The frequency deviation compensation scheme according to any one of Supplementary Notes 1 to 6,
wherein the phase offset compensation means compensates for the phase offset by inversely rotating the phase of the signal in a time domain by the phase offset.

[Supplementary Note 9]
A frequency deviation compensation scheme including:
a compensation amount calculation means for adjusting an amount of frequency deviation compensation of a signal in such a way that a phase offset caused to the signal is a predetermined amount when a frequency deviation of the signal is compensated for by frequency shifting; and
a frequency deviation compensation means for compensating for the frequency deviation of the signal based on the adjusted amount of compensation.

[Supplementary Note 10]
The frequency deviation compensation scheme according to Supplementary Note 9, wherein the predetermined amount is an integer multiple of $2\pi$.

[Supplementary Note 11]
The frequency deviation compensation scheme according to Supplementary Note 9 or 10, further including:
a parameter control means for adjusting at least one of an FFT/IFFT window size and an overlap size in such a way that a phase offset caused to the signal is a predetermined amount.

[Supplementary Note 12]

The frequency deviation compensation scheme according to any one of Supplementary Notes 9 to 11, further including:

a frequency deviation calculation means for calculating a first amount of frequency deviation compensation as the amount of frequency deviation compensation, wherein the parameter control means:

adjusts an FFT/IFFT window size and an overlap size in such a way that an FFT/IFFT window size is a positive number multiple of an overlap size; and sets, as a second amount of frequency deviation compensation, a value closest to the first amount of frequency deviation compensation among values obtained by dividing a sampling rate by an FFT/IFFT window size and multiplying the result by an integer multiple of twice the positive number, and wherein the frequency deviation compensation means compensates for the frequency deviation of the signal by shifting the signal in the frequency direction based on the second amount of frequency deviation compensation.

[Supplementary Note 13]

A frequency deviation compensation method including:

compensating for, by frequency shifting, a frequency deviation caused to a signal; and compensating for a phase offset caused to the signal due to the frequency shifting.

[Supplementary Note 14]

The frequency deviation compensation method according to Supplementary Note 13, including:

compensating for the phase offset by inversely rotating the phase of the signal by the calculated phase offset.

[Supplementary Note 15]

The frequency deviation compensation method according to Supplementary Note 13 or 14, including:

calculating a phase offset caused to the signal due to the frequency shifting; and compensating for the phase offset of the signal based on the calculated phase offset.

[Supplementary Note 16]

The frequency deviation compensation method according to any one of Supplementary Notes 13 to 15, including:

calculating an amount of frequency deviation compensation in the signal;

compensating for the frequency deviation of the signal based on the calculated amount of frequency deviation compensation; and calculating the phase offset based on the calculated amount of frequency deviation compensation.

[Supplementary Note 17]

The frequency deviation compensation method according to Supplementary Note 16, including:

calculating an amount of frequency deviation compensation for each of a plurality of blocks into which the signal is divided;

compensating for a frequency deviation for each of the plurality of blocks based on the calculated amount of frequency deviation compensation; and compensating for the phase offset which arises from a difference between an amount of phase rotation corresponding to an amount of frequency deviation compensation of one of the blocks and an amount of phase rotation corresponding to an amount of frequency deviation compensation of another block adjacent to the block.

[Supplementary Note 18]

The frequency deviation compensation method according to any one of Supplementary Notes 13 to 17, including:

calculating the phase offset based on the amount of frequency deviation compensation, an FFT/IFFT window size, and an overlap size.

[Supplementary Note 19]

The frequency deviation compensation method according to any one of Supplementary Notes 13 to 18, including:

compensating for the phase offset by inversely rotating the phase of the signal in a frequency domain by the phase offset.

[Supplementary Note 20]

The frequency deviation compensation method according to any one of Supplementary Notes 13 to 18, including:

compensating for the phase offset by inversely rotating the phase of the signal in a time domain by the phase offset.

[Supplementary Note 21]

A frequency deviation compensation method including:

adjusting an amount of frequency deviation compensation of a signal in such a way that a phase offset caused to the signal is a predetermined amount when a frequency deviation of the signal is compensated for by frequency shifting; and compensating for the frequency deviation of the signal based on the adjusted amount of frequency deviation compensation.

[Supplementary Note 22]

The frequency deviation compensation method according to Supplementary Note 21, wherein the predetermined amount is an integer multiple of $2\pi$.

[Supplementary Note 23]

The frequency deviation compensation method according to Supplementary Note 21 or 22, including:

adjusting at least one of an FFT/IFFT window size and an overlap size in such a way that the phase offset is a predetermined amount.

[Supplementary Note 24]

The frequency deviation compensation method according to any one of Supplementary Notes 21 to 23, including:

calculating a first amount of frequency deviation compensation as the amount of frequency deviation compensation;

adjusting an FFT/IFFT window size and an overlap size in such a way that an FFT/IFFT window size is a positive number multiple of an overlap size;

setting, as a second amount of frequency deviation compensation, a value closest to the first amount of frequency deviation compensation among values obtained by dividing a sampling rate by an FFT/IFFT window size and multiplying the result by an integer multiple of twice the positive number; and compensating for the frequency deviation of the signal by shifting the signal in the frequency direction based on the second amount of frequency deviation compensation.

[Supplementary Note 25]

A program causing a computer to execute the processes of:

compensating for, by frequency shifting, a frequency deviation caused to a signal; and compensating for a phase offset caused to the signal due to the frequency shifting.

[Supplementary Note 26]

The program according to Supplementary Note 25, including the process of:

compensating for the phase offset by inversely rotating the phase of the signal by the calculated phase offset.

[Supplementary Note 27]

The program according to Supplementary Note 25 or 26, including the processes of:

calculating a phase offset caused to the signal due to the frequency shifting; and compensating for the phase offset of the signal based on the calculated phase offset.

[Supplementary Note 28]

The program according to any one of Supplementary Notes 25 to 27, including the processes of:

calculating an amount of frequency deviation compensation of the signal;

compensating for the frequency deviation of the signal based on the calculated amount of frequency deviation compensation; and calculating the phase offset based on the calculated amount of frequency deviation compensation.

[Supplementary Note 29]

The program according to any one of Supplementary Notes 25 to 28, including the processes of:

calculating an amount of frequency deviation compensation for each of a plurality of blocks into which the signal is divided;

compensating for a frequency deviation of each of the plurality of blocks based on the calculated amount of frequency deviation compensation; and compensating for the phase offset which arises from a difference between an amount of phase rotation corresponding to an amount of frequency deviation compensation of one of the blocks and an amount of phase rotation corresponding to an amount of frequency deviation compensation of another block adjacent to the block.

[Supplementary Note 30]

The program according to any one of Supplementary Notes 23 to 29, including the process of:

calculating the phase offset based on the amount of frequency deviation compensation, an FFT/IFFT window size, and an overlap size.

[Supplementary Note 31]

The program according to any one of Supplementary Notes 23 to 30, including the process of:

compensating for the phase offset by inversely rotating the phase of the signal in a frequency domain by the phase offset.

[Supplementary Note 32]

The program according to any one of Supplementary Notes 23 to 28, including the process of:

compensating for the phase offset by inversely rotating the phase of the signal in a time domain by the phase offset.

[Supplementary Note 33]

A program causing a computer to execute the processes of:

adjusting an amount of frequency deviation compensation of a signal in such a way that a phase offset caused to the signal is a predetermined amount when a frequency deviation of the signal is compensated for by frequency shifting; and compensating for the frequency deviation of the signal based on the adjusted amount of frequency deviation compensation.

[Supplementary Note 34]

The program according to Supplementary Note 33, wherein the predetermined amount is an integer multiple of $2\pi$.

[Supplementary Note 35]

The program according to Supplementary Note 33 or 34, including the process of:

adjusting at least one of an FFT/IFFT window size and an overlap size in such a way that the phase offset is a predetermined amount.

[Supplementary Note 36]

The program according to any one of Supplementary Notes 33 to 35, including the processes of:

calculating a first amount of frequency deviation compensation as the amount of frequency deviation compensation;

adjusting an FFT/IFFT window size and an overlap size in such a way that an FFT/IFFT window size is a positive number multiple of an overlap size;

setting, as a second amount of frequency deviation compensation, a value closest to the first amount of frequency deviation compensation among values obtained by dividing a sampling rate by an FFT/IFFT window size and multiplying the result by an integer multiple of twice the positive number; and compensating for the frequency deviation of the signal by shifting the signal in the frequency direction based on the second amount of frequency deviation compensation.

The present application claims priority based on Japanese Patent Application No. 2013-236643 filed on Nov. 15, 2013, the entire disclosure of which is incorporated herein.

INDUSTRIAL APPLICABILITY

The present invention can be applied to any optical modulation scheme that is applied to optical communications.

REFERENCE SIGNS LIST

100 Local oscillation light generation unit
101 90 degrees hybrid
102-1, 102-2, 102-3, 102-4 Photo-electric conversion unit
103-1, 103-2, 103-3, 103-4 ADC
104 Digital signal processing unit
105-1, 105-2 Symbol identification unit
200 X polarization signal generation unit
201 Y polarization signal generation unit
202-1, 202-2 Frequency deviation rough compensation unit
203-1, 203-2 Waveform distortion compensation unit
204 Polarization demultiplexing unit
205-1, 205-2 Resampling unit
206-1, 206-2 Frequency deviation compensation unit
207-1, 207-2 Phase deviation compensation unit
300 Delay device
301 Frequency deviation estimation unit
302 Phase compensation amount calculation unit
400 Delay device
401 Frequency deviation setting unit
401' Frequency deviation calculation means
402 Phase compensation amount calculation unit
403, 503 Overlap addition unit
404, 504 FFT unit
405, 505 Frequency shifting unit
405' Frequency deviation compensation means
406, 506 IFFT unit
407, 507 Overlap deletion unit
408, 508 Phase offset compensation unit
408' Phase offset compensation means
409, 509 Phase offset amount calculation unit
410, 510 Frequency shift amount calculation unit 410' Compensation amount calculation means
411, 511 Parameter control unit
412 Real part extraction unit
413 Imaginary part extraction unit
414 Low-pass filter
415 Frequency deviation calculation unit
501 Frequency deviation estimation unit

The invention claimed is:

1. An optical receiver configured to receive a plurality of optical signals including a plurality of optical carriers output from an optical fiber that transmits the plurality of optical signals, each of the plurality of optical signals being generated by phase-modulating each of the plurality of optical carriers in accordance with a plurality of digital data signals distributed from a data series, the plurality of optical signals being multiple-input to the optical fiber and being multiple-output from the optical fiber, the optical receiver comprising:
  a plurality of photo-electric converters configured to convert a plurality of received optical signals into a plurality of electrical signals;
  a plurality of analog-to-digital converters configured to convert the plurality of electrical signals to a plurality of digital signals;
  a frequency deviation compensator configured to compensate for a frequency deviation of the plurality of received optical signals, by frequency shift process to the plurality of digital signals; and
  a phase offset compensator configured to compensate for a phase offset of a plurality of frequency deviation-compensated digital signals caused by the frequency shift process.

2. An optical receiver configured to receive a plurality of optical signals including a plurality of optical carriers output from an optical fiber that transmits the plurality of optical signals, each of the plurality of optical signals being generated by phase-modulating each of the plurality of optical carriers in accordance with a plurality of digital data signals distributed from a data series, the plurality of optical signals being multiple-input to the optical fiber and being multiple-output from the optical fiber, the optical receiver comprising:
  a plurality of photo-electric converters configured to convert a plurality of received optical signals into a plurality of electrical signals;
  a plurality of analog-to-digital converters configured to convert the plurality of electrical signals to a plurality of digital signals;
  a compensation amount calculator configured to identify a frequency deviation amount in accordance with a phase offset amount corresponding to a phase offset caused by a frequency shift process to the plurality of digital signals; and
  a frequency deviation compensator configured to compensate, based on the frequency deviation amount, for a frequency deviation of the plurality of received optical signals.

3. The optical receiver according to claim 1, wherein the phase offset compensator compensates for the phase offset by inversely rotating a phase of the frequency deviation-compensated digital signals.

4. The optical receiver according to claim 1, further comprising a phase offset calculator configured to calculate a phase offset amount,
  wherein
    the phase offset compensator is configured to compensate for the phase offset based on the calculated phase offset amount.

5. The optical receiver according to claim 4, further comprising a frequency deviation calculator configured to calculate a frequency deviation compensation amount,
  wherein
    the frequency deviation compensator is configured to compensate for the frequency deviation based on the calculated frequency deviation compensation amount, and
    the phase offset calculator is configured to calculate the phase offset amount based on the calculated frequency deviation compensation amount.

6. The optical receiver according to claim 4, wherein the phase offset calculator is configured to calculate the phase offset amount based on a frequency deviation compensation amount compensated by the frequency deviation compensator, an FFT/IFFT window size, and an overlap size.

7. The optical receiver according to claim 1, further comprising a frequency deviation estimator configured to
  estimate the frequency deviation, and
  output a frequency deviation estimated value to the frequency deviation compensator and the phase offset compensator when a frequency deviation compensation amount compensated by the frequency deviation compensator is dynamically changed.

8. The optical receiver according to claim 2, wherein the phase offset amount is an integer multiple of $2\pi$.

9. The optical receiver according to claim 2, wherein the phase offset amount is equivalent to zero.

10. The optical receiver according to claim 2, further comprising a parameter controller configured to adjust at least one from among an FFT/IFFT window size and an overlap size, in accordance with the phase offset amount.

11. The optical receiver according to claim 2, further comprising a frequency deviation estimator configured to
  estimate the frequency deviation, and
  output a frequency deviation estimated value to the compensation amount calculator when the frequency deviation compensation amount compensated by the frequency deviation compensator is dynamically changed.

12. The optical receiver according to claim 1, wherein the frequency deviation compensator is configured to compensate for the frequency deviation upstream of a distortion compensator that is provided in the optical receiver.

13. The optical receiver according to claim 1, wherein the frequency deviation compensator is configured to compensate for the frequency deviation upstream of a polarization demultiplexer that is provided in the optical receiver.

14. The optical receiver according to claim 2, wherein the frequency deviation compensator is configured to compensate for the frequency deviation upstream of a distortion compensator that is provided in the optical receiver.

15. The optical receiver according to claim 2, wherein the frequency deviation compensator is configured to compensate for the frequency deviation upstream of a polarization demultiplexer that is provided in the optical receiver.

* * * * *